US008845411B2

(12) United States Patent
Chen et al.

(10) Patent No.: US 8,845,411 B2

(45) Date of Patent: Sep. 30, 2014

(54) REDUCED POWER CONSUMPTION WAGER GAMING MACHINE

(71) Applicant: IGT, Reno, NV (US)

(72) Inventors: Xuedong Chen, Reno, NV (US); Binh Nguyen, Reno, NV (US); Brian Underdahl, VC Highlands, NV (US)

(73) Assignee: IGT, Las Vegas, NV (US)

( * ) Notice: Subject to any disclaimer, the term of this patent is extended or adjusted under 35 U.S.C. 154(b) by 143 days.

(21) Appl. No.: 13/665,373

(22) Filed: Oct. 31, 2012

(65) Prior Publication Data

US 2013/0059665 A1 Mar. 7, 2013

Related U.S. Application Data

(63) Continuation of application No. 12/369,530, filed on Feb. 11, 2009, now Pat. No. 8,323,087, which is a continuation-in-part of application No. 11/522,700, filed on Sep. 18, 2006, now abandoned.

(51) Int. Cl.

| | |
|---|---|
| ***A63F 13/00*** | (2014.01) |
| ***A63F 9/24*** | (2006.01) |
| ***G07F 17/32*** | (2006.01) |

(52) U.S. Cl.

CPC ........ *G07F 17/3244* (2013.01); *G07F 17/3234* (2013.01); *G07F 17/3269* (2013.01); *G07F 17/3202* (2013.01)

USPC .................. 463/19; 463/12; 463/13; 463/42; 463/25; 463/16; 463/20

(58) Field of Classification Search

USPC ........ 463/19, 12, 13, 42, 1, 25, 29, 31, 30, 10

See application file for complete search history.

(56) References Cited

U.S. PATENT DOCUMENTS

| | | | |
|---|---|---|---|
| 5,283,905 | A | 2/1994 | Saadeh et al. |
| 5,455,863 | A | 10/1995 | Brown et al. |

(Continued)

FOREIGN PATENT DOCUMENTS

| | | |
|---|---|---|
| EP | 0 663 634 A2 | 7/1995 |
| EP | 0 717 341 A1 | 6/1996 |

(Continued)

OTHER PUBLICATIONS

European Examination Report mailed Jul. 24, 2009 in Application No. 07842597.2.

(Continued)

*Primary Examiner* — Zandra Smith
*Assistant Examiner* — Tsz Chiu
(74) *Attorney, Agent, or Firm* — Foley & Lardner LLP

(57) ABSTRACT

A wager gaming machine having software and components allowing for automatic powering on and off (also referred to as remote out-of-band power control) bypassing the need for human operator intervention is described. The gaming machine has a master gaming controller and a network interface. The interface includes an input port supporting a TCP/IP connection which can be used by another network component having the gaming machine's IP address. The gaming machine may also include a Web server operating on the input port. The Web server may receive HTTP messages on the input port even when the gaming machine is powered off. Thus, the machine is capable of receiving an HTTP message at the input port instructing the machine to power on. The gaming machine may also contain a manageability engine processor for executing an active management system software component. This component implements the Web server on the gaming machine.

16 Claims, 20 Drawing Sheets

(56) References Cited

U.S. PATENT DOCUMENTS

| | | | |
|---|---|---|---|
| 5,687,079 A | 11/1997 | Bauer et al. | |
| 6,369,466 B1 | 4/2002 | Murphy | |
| 6,839,854 B2 | 1/2005 | Nguyen | |
| 7,063,615 B2 | 6/2006 | Alcorn et al. | |
| 7,181,370 B2 | 2/2007 | Furem et al. | |
| 7,780,520 B2 * | 8/2010 | Baerlocher | 463/25 |
| 7,914,377 B2 * | 3/2011 | Benbrahim et al. | 463/25 |
| 2003/0096550 A1 | 5/2003 | South | |
| 2004/0166940 A1 | 8/2004 | Rothschild | |
| 2005/0059494 A1 | 3/2005 | Kammler | |
| 2005/0149773 A1 | 7/2005 | Kevan | |
| 2005/0239545 A1 | 10/2005 | Rowe | |
| 2007/0191111 A1 | 8/2007 | Sylla et al. | |
| 2008/0070652 A1 | 3/2008 | Nguyen et al. | |
| 2008/0091965 A1 | 4/2008 | Nychka et al. | |
| 2008/0220858 A1 | 9/2008 | Canterbury et al. | |

FOREIGN PATENT DOCUMENTS

| | | |
|---|---|---|
| EP | 0 757 437 A2 | 2/1997 |
| EP | 1 542 178 A2 | 6/2005 |
| EP | 1 589 403 A2 | 10/2005 |
| GB | 2 296 806 A | 7/1996 |
| JP | 2003-135694 A | 5/2003 |
| WO | WO-99/30460 A2 | 6/1999 |
| WO | WO-00/03775 A1 | 1/2000 |
| WO | WO-00/74306 A2 | 12/2000 |
| WO | WO-00/74402 A1 | 12/2000 |
| WO | WO-2005/017809 A2 | 2/2005 |
| WO | WO-2005/017809 A3 | 2/2005 |
| WO | WO-2005/069105 A1 | 7/2005 |
| WO | WO-2007/014135 A2 | 2/2007 |
| WO | WO-2008/036593 A2 | 3/2008 |

OTHER PUBLICATIONS

International Search Report dated May 19, 2008 in International Application No. PCT/US2007/078626, including Notification of Transmittal.

Shankland, Stephen; "Power could cost more than servers, Google warns"; www.news.com/2001-1_3.0.html?tag=prntfr.

US Final Office Action dated Jun. 3, 2010 in U.S. Appl. No. 11/522,700.

US Office Action dated Dec. 23, 2008 in U.S. Appl. No. 11/522,700.

Written Opinion of International Searching Authority dated May 19, 2008 in International Application No. PCT/US2007/078626.

* cited by examiner

REDUCED POWER CONSUMPTION WAGER GAMING MACHINE

CROSS-REFERENCE TO RELATED APPLICATIONS

This application is a continuation of and claims priority under section 35 U.S.C. 120 to commonly assigned U.S. application Ser. No. 12/369,530, which is a continuation-in-part of U.S. application Ser. No. 11/522,700, filed Sep. 18, 2006, now abandoned, the disclosures of which are hereby incorporated by reference in their entirety and for all purposes.

BACKGROUND OF THE INVENTION

1. Field of the Invention

The present invention relates to wager gaming machines for playing games of chance. More specifically, it relates to reducing electrical power consumption by gaming machines and gaming machine components and peripherals.

2. Description of the Related Art

Gaming is an increasingly popular industry, with casinos and other gaming establishments continually seeking new and exciting ways to present games of chance for play. Many wagering games are typically presented on large, free-standing or stand-alone gaming devices, such as electronic slot machines, video poker machines and the like.

Energy consumption at casinos and gaming establishments has been increasing for many years. As the number of electronic gaming machines has grown, the more power casinos and gaming establishments consume and as energy costs have been rising, this has greatly increased the cost of operating the current generation of gaming machines. For example, if the total power consumption of an average gaming machine (including the top box and various lights) is about 400 watts, it costs a casino around $280 per year to run the machine. For a casino with 3,000 gaming machines, the power costs could easily top $800,000 per year, not taking into account the increased cost of air conditioning necessary to offset the heat generated by the machines. Reducing the power consumption by 35%-40% could easily save a large gaming operation over $300,000 a year at current rates.

One of the time-honored marketing and image-creating strategies of the gaming industry is that the vast majority of gaming machines in a casino are essentially always on. The flashing lights, sounds, and continual operating state of nearly all of a gaming machine's components and peripherals, such printers, card readers, bill validators, hoppers, and so on, all require power and are, in fact, powered at all times. There are a number of reasons for this mode of operation at gaming establishments. One is that gaming operators, as entities in many other businesses, are always seeking to attract potential users to their products and services. In casinos these potential users are often people who are passing by the gaming machines and whose attentions are often drawn to, for example, a video poker machine because of lights and sounds (sometimes referred to as "attract sequences") which, the gaming industry has long-believed must always be on. It has been assumed that certain components and peripherals must also always be powered given that potential wager gaming machine users are thought of as having little patience to wait for components to power up, such as longer than one or two seconds. Thus, for these and various other reasons, gaming machines are often on "24/7" and are typically brought down only for maintenance or repair.

Other tangential and incidental energy drains from the constant operation of thousands of gaming machines at many gaming establishments include the increased need for climate control, such as air conditioning and ventilation, to compensate for the heat released from the gaming machines. Generally, the gaming industry believes—and data from electrical utility companies confirm—that significant financial savings can be realized from more intelligent use of power in gaming machines. Moreover, intelligent and more refined use of power will conserve our natural resources.

In spite of these benefits, the gaming industry has been slow to adapt power reduction measures in gaming machines. It is reluctant to alter its conventional marketing methods or change its image. A nearly immutable element of the gaming business in the U.S. and around the world is that it is flashy and attention grabbing. This is what the vast majority of gamers have come to expect and, therefore, is not likely to change radically anytime in the near future. Although there have been some incremental changes over the years, none have significantly affected the power consumption of wager gaming machines. For example, sound emitted from some machines can be adjusted by a gaming operator or by a player by using a slider mechanism to control volume. However, even this small concession by the gaming operators was motivated by a need to reduce noise irritation rather than power consumption. Of course, gaming operators can manually turn off individual gaming machines, machine components and peripherals, or an entire bank of gaming machines. However, the powering down of machines is not done automatically or, more importantly, intelligently for the purpose of saving energy while concurrently not affecting the ability to attract potential gamers or falling short of expectations from playing wagering games on the modern gaming machine.

SUMMARY OF THE INVENTION

In one embodiment a wager gaming machine has software and components allowing for automatic powering on and off (also referred to as remote out-of-band power control) bypassing the need for human operator intervention. The gaming machine has a master gaming controller and a network interface. The interface includes an input port supporting a TCP/IP connection which can be used by another network component having the gaming machine's IP address. The gaming machine may also include a Web server operating on the input port. The Web server may receive HTTP messages on the input port even when the gaming machine is powered off. Thus, the machine is capable of receiving an HTTP message at the input port instructing the machine to power on. The gaming machine may also contain a manageability engine processor for executing an active management system software component. This component implements the Web server on the gaming machine. In one embodiment the input port is port number 16992 for receiving HTTP messages or 16993 for HTTPS messages. In one embodiment the active management system software component is in communication with the BIOS in gaming machine.

Another embodiment is a method of powering on a wager gaming machine without the need for human intervention. A command to power on a wager gaming machine based on a triggering event is received at a power control server or host server, the wager gaming machine being in a power off state. An HTTP power-on message for powering on the wager gaming machine is created using a Web browser on the power control server. The HTTP power-on message is transmitted to the wager gaming machine over a TCP/IP connection, where the wager gaming machine receives the message via an HTTP-specific port supporting a Web server. Upon the gaming machine, being in a power down state, receiving the message at the HTTP port, a BIOS system within the wager gaming machine is activated via an active management system component, implementing the Web server on the gaming machine. This enables the machine to go from a power off state to a power on state without human intervention. Triggering events detected by the power control server may be one or more of various types of occurrences, including being a specific time or day, reaching a threshold level of activity in the area, detecting motion near the gaming machine, and others.

Another embodiment is a method of powering off a wager gaming machine. A command to power off a wager gaming machine based on a triggering event is received at a power control server. An HTTP power-off message for the wager gaming machine is created on the server. An HTTP power-on message for the wager gaming machine is created and transmitted to the wager gaming machine over a TCP/IP connection, wherein the wager gaming machine receives the message at an HTTP-specific port, thereby causing the gaming machine to be powered off in a normal manner but without human intervention.

In another embodiment, a gaming network includes a host server having a Web browser for displaying an active management Web page. It also includes an IP-addressable wager gaming machine having an input port supporting a Web server and having a manageability engine processor for executing an active management system. A TCP/IP connection connects the host server and the wager gaming machine. In one embodiment the host server is a power control server in a server-based gaming network. In another embodiment, the IP-addressable wager gaming machine further includes a flash memory storing a BIOS and the active management system.

Some embodiments of the present invention are computer-readable storage mediums, for example tangible computer program products such as CD-ROMs or USB memory devices, that store computer code that can be executed on a wager gaming machine, general-purpose computers, gaming network servers, and various other computer and network devices. The computer code contains instructions for executing the method aspects of the present invention described above for implementing power consumption control in a gaming network having one or more gaming machine zones.

Embodiments of the present invention provide hardware (such as power controllers, gaming machines, power control system servers, network devices and so on) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
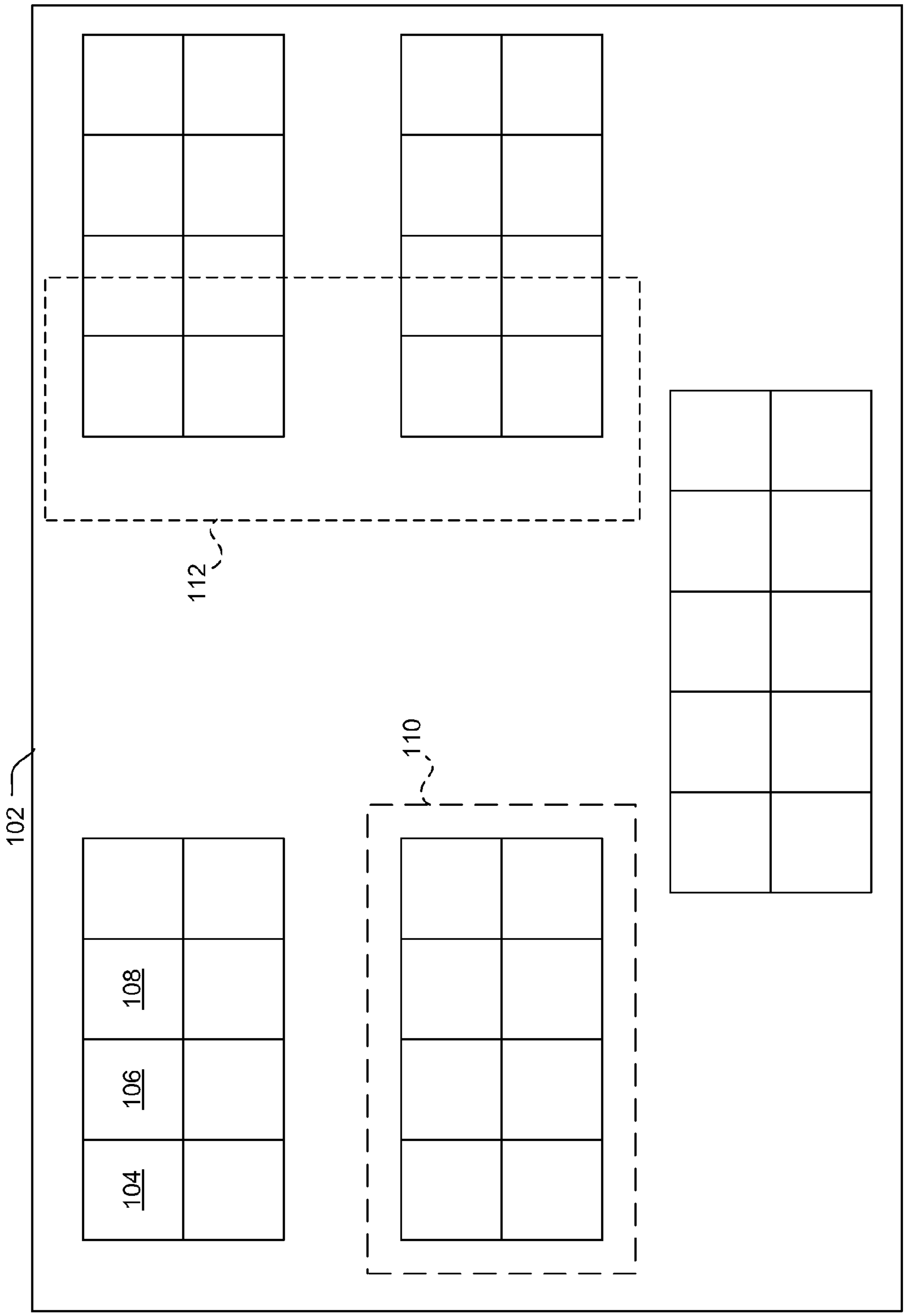
FIGS. 1A and 1B are top-views of gaming machine floor layouts showing possible gaming machine zones.

Exemplary applications of networks, systems and methods according to the present invention are described. These examples are provided solely to add context and aid in the understanding of the invention. Thus, it will be apparent to one skilled in the art that the present invention may be practiced without some or all of the specific details described herein. In other instances, well-known process steps, system components, and software and network concepts have not been described in detail in order to avoid unnecessarily obscuring the present invention. Other applications are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

For example, although the present invention is directed primarily to wager gaming machines, networks, and servers, it is worth noting that some of the systems and methods disclosed herein might be adaptable for use in other types of networks and environments, such that their use is not restricted exclusively to the wager gaming context. In fact, it will be readily appreciated that, for example, a wide variety of power distribution and allocation hardware devices and activity usage monitoring tools can be used in conjunction with the inventive systems and methods disclosed herein. Such other adaptations may become readily apparent upon review of the following detailed description. Although such other applications can be used with the inventive systems and methods disclosed herein, for purposes of clarity the discussion here shall focus on examples involving actual gaming machines and servers for purposes of clarity.

A power consumption control system to control energy provided to a wager gaming machine in a gaming network is described in the figures. The power control system enables a gaming operator fine tune electrical power supply to components of a gaming machine in an intelligent manner so that power is not wasted on gaming machines when it is determined that the machine or component is not likely to be in use. The control system can also be used in other wager gaming machine configurations such as multi-station gaming tables, peer-to-peer networks, stand-alone machines, and variations thereof.

In the context of a gaming network, a preferred embodiment of the power consumption control system of the present invention is used to control energy consumption of components of a gaming machine from examining activity usage data from a single machine and from a zone of machines. In a preferred embodiment, a primary underlying characteristic of machines in the same zone is their physical proximity. In another example, a zone may be comprised of all gaming machines located in a corner of the casino floor or all machines located on or near a main thoroughfare in a casino. Zones may also be defined according to factors other than physical proximity, such as historical or present levels of gaming activity, the number of nearby patrons, etc. For example, zones may be defined according to historical usage data, activity levels, patron traffic patterns, etc., as described elsewhere herein.

Figure 1B:
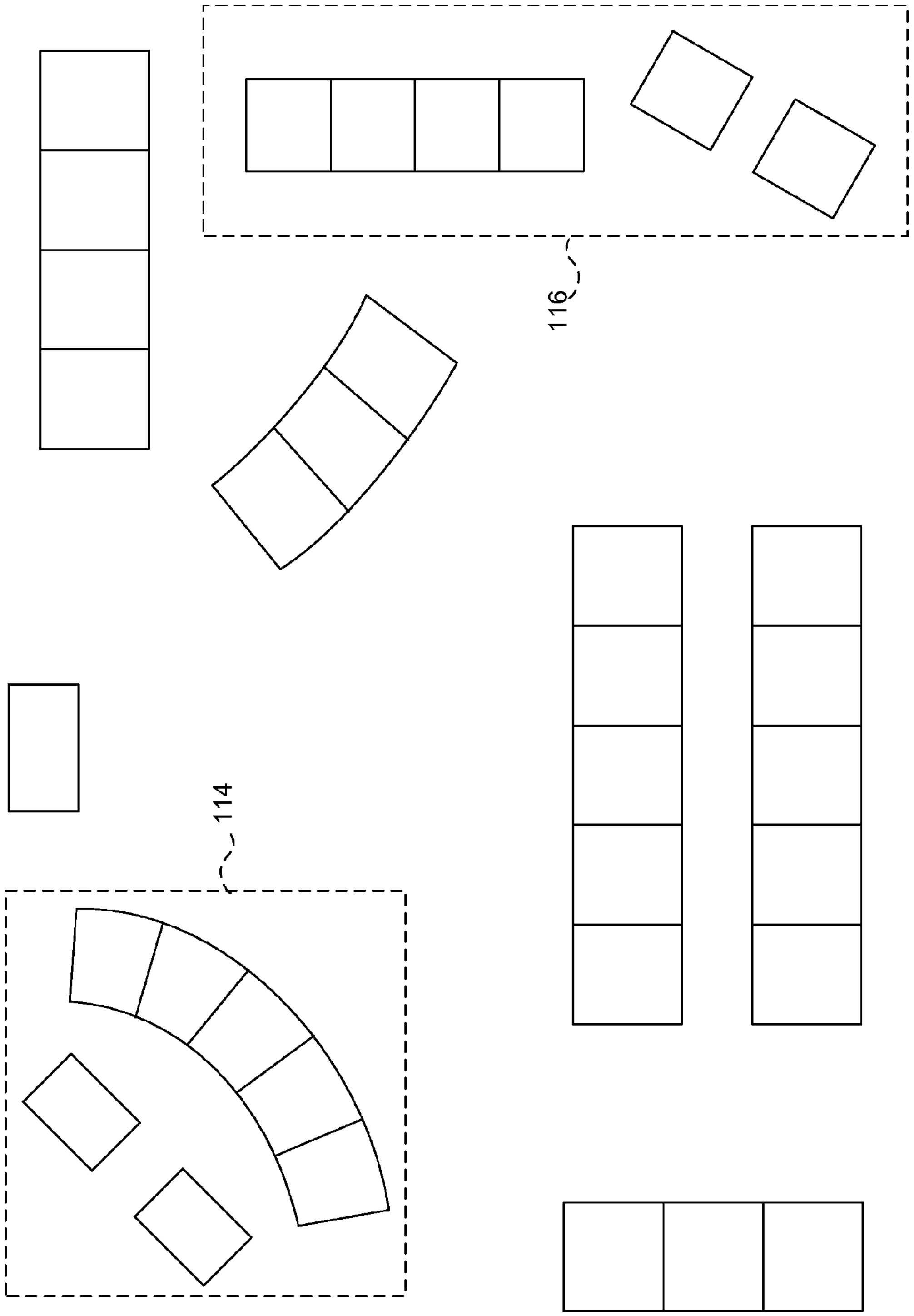

FIG. 1A is a top-view of a gaming machine floor layout showing possible gaming machine zones. A gaming machine layout 102 shows numerous gaming machines 104, 106, 108 and so on. A zone 110 is comprised of machines grouped together in the same bank of machines. Another zone 112 contains gaming machines along one end of two gaming machine banks FIG. 1B is another example gaming machine floor layout in a gaming establishment. A few example zones 114 and 116 are shown within the dashed lines. As can be seen from the examples shown in FIGS. 1A and 1B, there can be many various configurations of gaming machine zones. The most suitable zone configuration may be determined, at least in part, by the power consumption control needs of a gaming operator. A gaming operator can uniformly control power supplied to all gaming machines in the same zone. For example, using the control system of the present invention, a gaming operator can turn off all the hoppers and printers of some or all gaming machines in the same zone. As described in detail below, a gaming machine has numerous components, such as displays, lights, coin acceptors, disk drives, bill acceptors, printers, card readers, motor controller, and light controller and so on. Generally, each component consumes power. In a preferred embodiment, the power consumption control system of the present invention controls power consumption of a gaming machine by controlling the power provided to its components, rather than by "pulling the cord" on the entire machine, that is, by cutting off power to the entire gaming machine.

As described in greater detail below, in a preferred embodiment, specific gaming machine components are powered on or off depending on historical usage data and activity levels as well as on specific, unpredictable actions taken on a specific machine by users or potential users, such as inserting a card or bill, approaching a machine, or pausing by a machine.

One set of data utilized by the power control system to control power consumption can be characterized as activity or activity usage pattern data. As described in greater detail below, historical and statistical data on usage of gaming machines in a zone, on individual gaming machines, and on components of a machine may be used to derive intelligence on when to preemptively 'turn down' the energy to "cold" zones in a gaming establishment.

Figure 2:
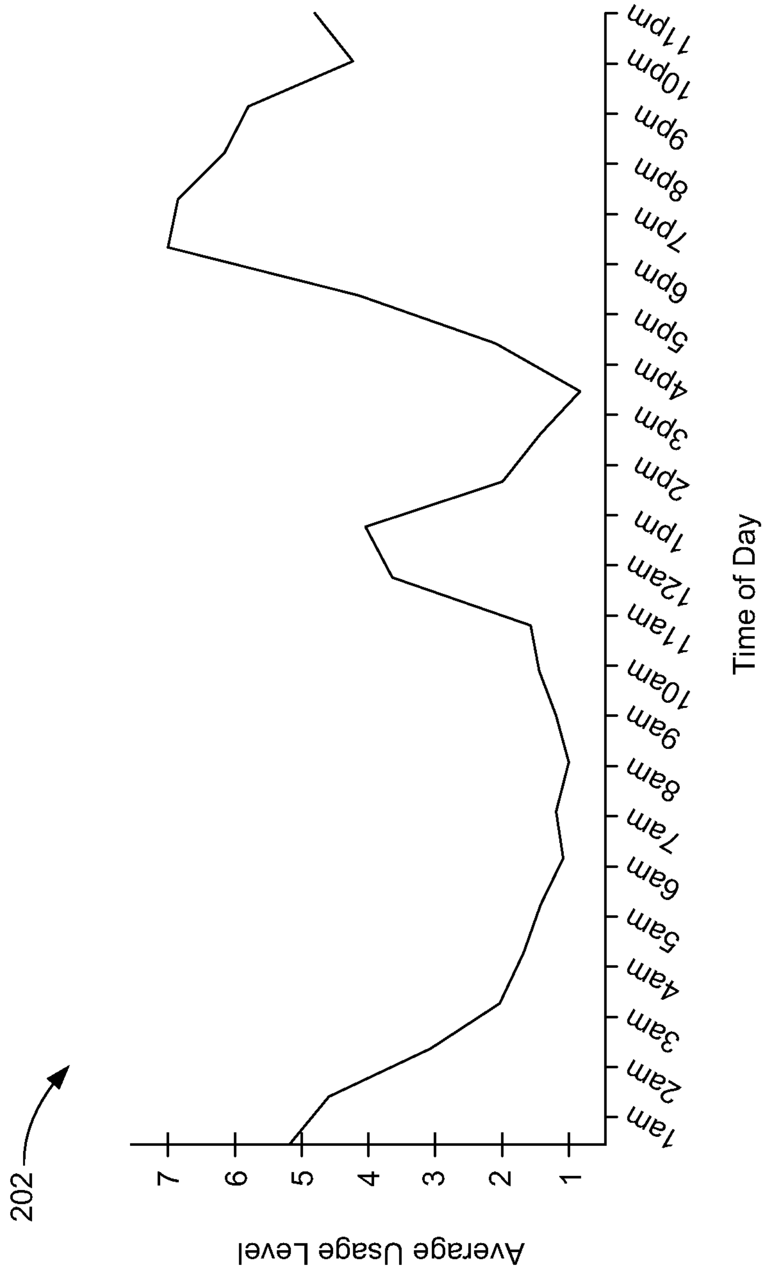
FIG. 2 is a sample graphical representation showing average usage levels of gaming machines in a zone.

In a preferred embodiment, raw activity data for a zone of gaming machines are collected and tabulated. In an alternative embodiment, the same data can be collected for a specific gaming machine and for specific components in a gaming machine. FIG. 2 is a sample graphical representation showing average usage levels of gaming machines in a zone. Shown is a graph 202 with average usage levels of machines in the zone shown on the vertical axis and hourly time increments shown on the horizontal axis. For example, the average usage level of gaming machines in the zone represented by graph 202 is highest between 6 and 7 pm. The usage data and patterns of each zone of a gaming establishment can be examined to derive a "heat map" of the casino floor, where "heat" refers to activity on gaming machines in each zone, to the number of patrons in a zone within predetermined time intervals, or to other such metrics. The type of raw activity usage data gathered for a gaming machine includes, to name a few examples, winnings, payouts, most common and least common selected denominations, the number of bills and coins accepted every x minutes, the number of card reads every y minutes, the number of patrons detected in the vicinity of a gaming machine during a predetermined time interval and so on. According to some implementations of the invention, zones may be determined in an ad hoc manner, according to activity levels or other such measures of "heat," rather than defining zones in advance and then determining activity levels in the previously-defined zones. Still other implementations of the invention allow zones to be arbitrarily defined, but also allow such zones to be updated according to observed patterns of patron activity or the like.

Software tools are available that are proficient at measuring and analyzing gaming machine usage and creating heat maps which gaming operators can use, for example, to re-configure and optimize casino floors for better gaming activity, to identify games, game themes, and wager gaming machines that are not attracting users, and so on. For example, Compudyne, Inc. of Annapolis, Md., makes such a product. However, as is known in the field of wager gaming networks, a gaming operator can obtain activity and usage data for a particular machine by sending certain native commands to a machine. Thus, third-party activity measuring tools are not necessary to implement the present invention.

Figure 3:
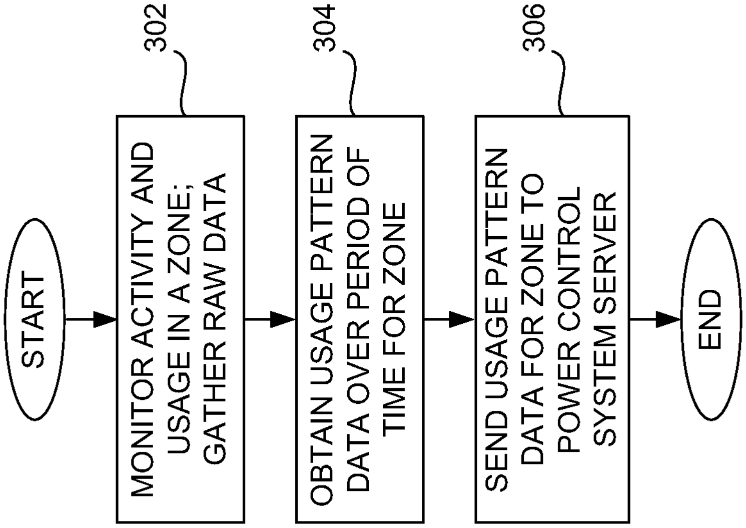
FIG. 3 is an overview flow diagram of a process of obtaining usage pattern data in accordance with one embodiment of the present invention.

Although these activity data can be used to derive heat maps, when collected over a period of time these data can also provide a history of usage for gaming machines in a zone or for a specific machine. As described in detail below, this history of usage can be used to derive usage patterns that are used as one factor in controlling the power supplied to a gaming machine's components. FIG. 3 is an overview flow diagram of a process of obtaining usage pattern data in accordance with one embodiment of the present invention. Steps of the methods shown and described need not be performed (and in some implementations are not performed) in the order indicated. Some implementations of these methods may include more or fewer steps than those described. At step 302 a gaming operator measures activity and usage of gaming machines in a zone, thereby obtaining unprocessed activity data for that zone. In another embodiment, the activity data measured are for individual gaming machines. The granularity of the data can be adjusted to suit the needs of the gaming operator. In a simple example, shorter time intervals between measurements and fewer machines in each zone will enable a gaming operator to perform more refined tuning of the power consumption control system of the present invention. Increasing the number of metrics would also increase the level of control. As noted above, the raw data can be gathered using external tools, gaming machine commands, or a combination of both.

At step 304 the raw activity data collected for a period of time are examined to obtain usage patterns. Although the time period can vary, one of the purposes of collecting the raw data is to have a statistically meaningful body of activity data so that when examining the accumulated historical data, useful and accurate usage patterns can be identified. It is estimated that generally such patterns may be discernable in the wager gaming machine context from about four to six weeks of collected activity data. Many factors can influence this, such as time of year, special events, changes in gaming floor environment, and so on. Data thus acquired may be analyzed and/or aggregated in any convenient fashion. These raw data can be analyzed for patterns by human beings or by using suitable pattern-identifying software tools that can be used alone or in combination with analysis by individuals. In some implementations, data from individual gaming machines are used to determine activity zones or the like. For example, such data may be plotted on a map and contoured to establish activity zones.

At step 306 pattern data are sent to a power control system server or other suitable network server capable of executing a power control system process, where they are stored or from where the data can be accessed and managed. In a preferred embodiment, a power control system server, described in greater detail below, can be referred to as a global power controller for gaming machines. In the embodiment where raw data are measured only for a specific gaming machine, the pattern data can be stored on the gaming machine or on both the gaming machine and the power control system server. In one embodiment, usage pattern data for a specific machine are stored on that machine thereby eliminating the need to rely on an external network component, such as the power server, to regulate the gaming machine's own power consumption.

Figure 4:
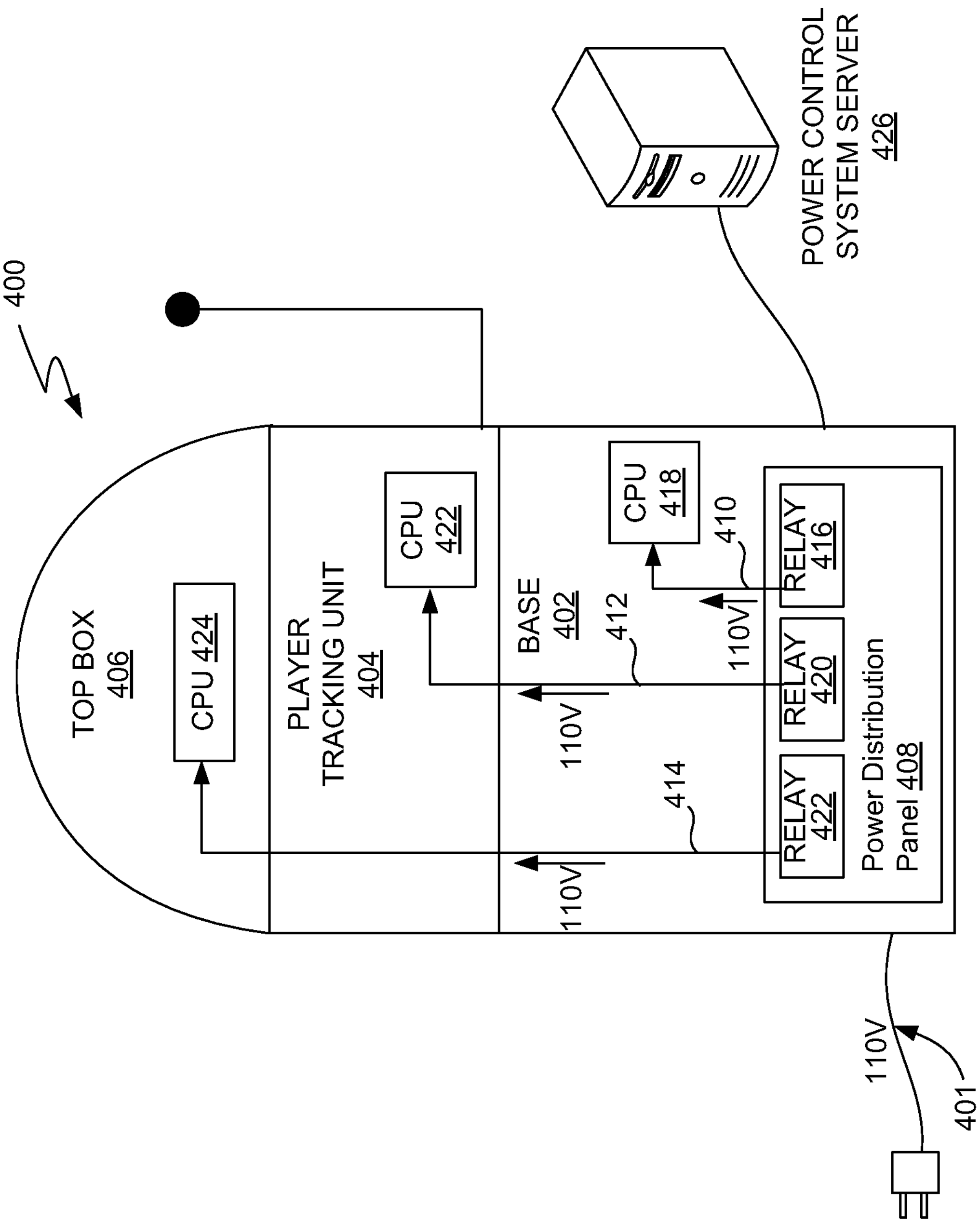
FIG. 4 is a block diagram showing gaming machine hardware and power-related devices as they relate to the power control system of the present invention.

It is useful at this point to describe gaming machine hardware and power-related devices as they relate to the power control system of the present invention. Such devices are shown in FIG. 4. A more detailed description of a wager gaming machine is also provided below with reference to FIGS. 13 and 14. An electronic gaming machine 400 is connected via cord 401 to a power source, such as a 110v A/C output. The voltage necessary to operate machine 400 can vary according to the geographic location of gaming machine 400. Techniques for addressing out-of-tolerance voltages, such as having tighter voltage margins, are discussed below with reference to FIG. 13. A gaming machine can have multiple segments. In exemplary machine 400 there are three segments: a base 402, a player tracking unit 404, and a top box 406. In other embodiments, these segments can be referred to using different terms, can perform functions different from those described, or can be combined (e.g., player tracking unit may be included in the top box). Power is supplied to machine 400 via connection 401 and is initially received by a power distribution panel 408.

Electrical power is distributed from panel 408 to segments 402, 404, and 406 of gaming machine 400. In exemplary gaming machine 400, three electrical connections, 410, 412, and 414, originate from power distribution panel 408 to three CPUs, via relays, providing power to the CPUs. Electrical connection 410 transmits current via relay 416 to base CPU 418. Similarly, electrical connection 412 transmits current via relay 420 to CPU 422 of player tracking segment 404 and connection 414 transmits current via relay 422 to CPU 424 of top box 406. In another embodiment, power distribution panel 408 is on a power control system server 426 which distributes power to the various gaming machine components. In other embodiments, there can be more or fewer CPUs or CPU-related components in gaming machine 400 that receive power from distribution panel 408. In yet other embodiments, power can be supplied directly from an external power source to a CPU or other gaming machine component so that power is not supplied through distribution panel 408.

Figure 5:
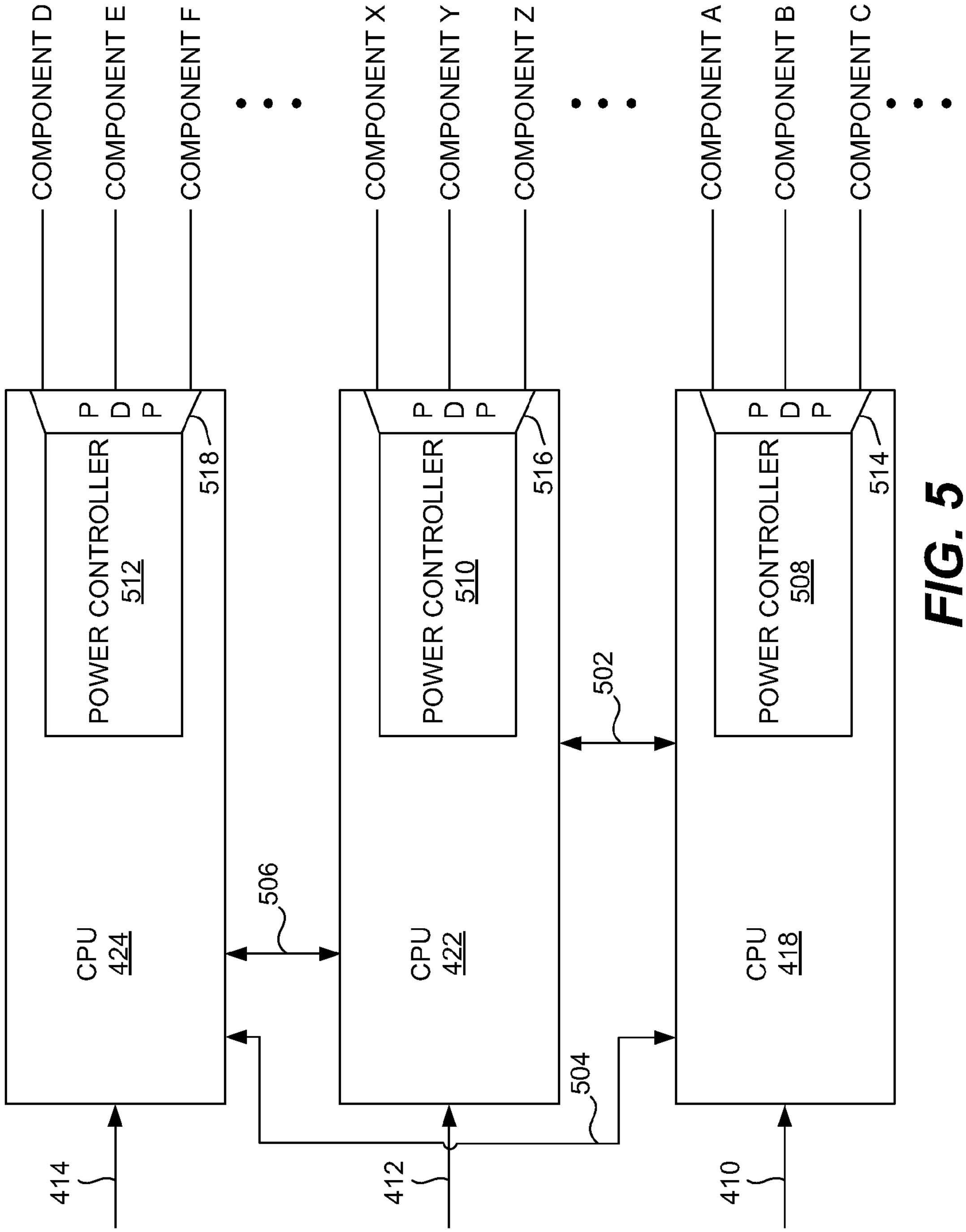
FIG. 5 is a block diagram showing details of CPUs and distribution of power to components in accordance with one embodiment of the present invention.

FIG. 5 is a block diagram showing details of CPUs 418, 422, and 424 and distribution of power to components in accordance with one embodiment of the present invention. In one implementation of gaming machine 400, CPUs 418, 422, and 424 communicate with each other. CPU 418 and 422 are connected via a connection 502 which can be, for example, a USB connection or an Ethernet connection. CPU 418 and 424 are connected via connection 504 and CPUs 422 and 424 are connected via connection 506. In a preferred embodiment, CPUs 418, 422, and 424 control operation of one or more gaming machine components, each of which consume power. For example, base CPU 418 can control numerous components including a printer, bill and coin acceptors, lights, a hopper, displays, disk drives, among other components. These components are represented generically as components A, B, C, and so forth in FIG. 5. With respect to player tracking unit CPU 422, exemplary components include a card reader, printer, display, and disk drives, shown in FIG. 5 as components X, Y, Z, and so on. With top box CPU 424, components under its control may include a light controller, displays, and a motor controller. It will be appreciated that these components are illustrative and that a particular CPU can have under its control more or fewer components and peripherals than those listed.

Also shown in FIG. 5 are three power controllers 508, 510, and 512, each operating in conjunction with CPU 418, 422, and 424, respectively. In a preferred embodiment a power controller, described in greater detail below, is embedded on a CPU board. In other embodiments, a power controller is implemented as a software module or as a separate hardware component that is operatively coupled with the CPU. Also shown in FIG. 5 are three CPU-level power distribution panels, 514, 516, and 518 each of which distribute power to the components. As is known in the art, power distribution panels 408 (gaming machine-level), 514, 516, and 518, can be seen as "crowbars" that provide or cut off power to a CPU, component, etc. often according to power-related commands or signals it receives. In another embodiment, a single power controller can be used in conjunction with two or more CPUs (and their associated components) by utilizing communication lines 502, 504, and 506. In another preferred embodiment, a power controller can reside on power control system server 426 or other network server, such as a server-based gaming ("SBG") server.

Figure 6:
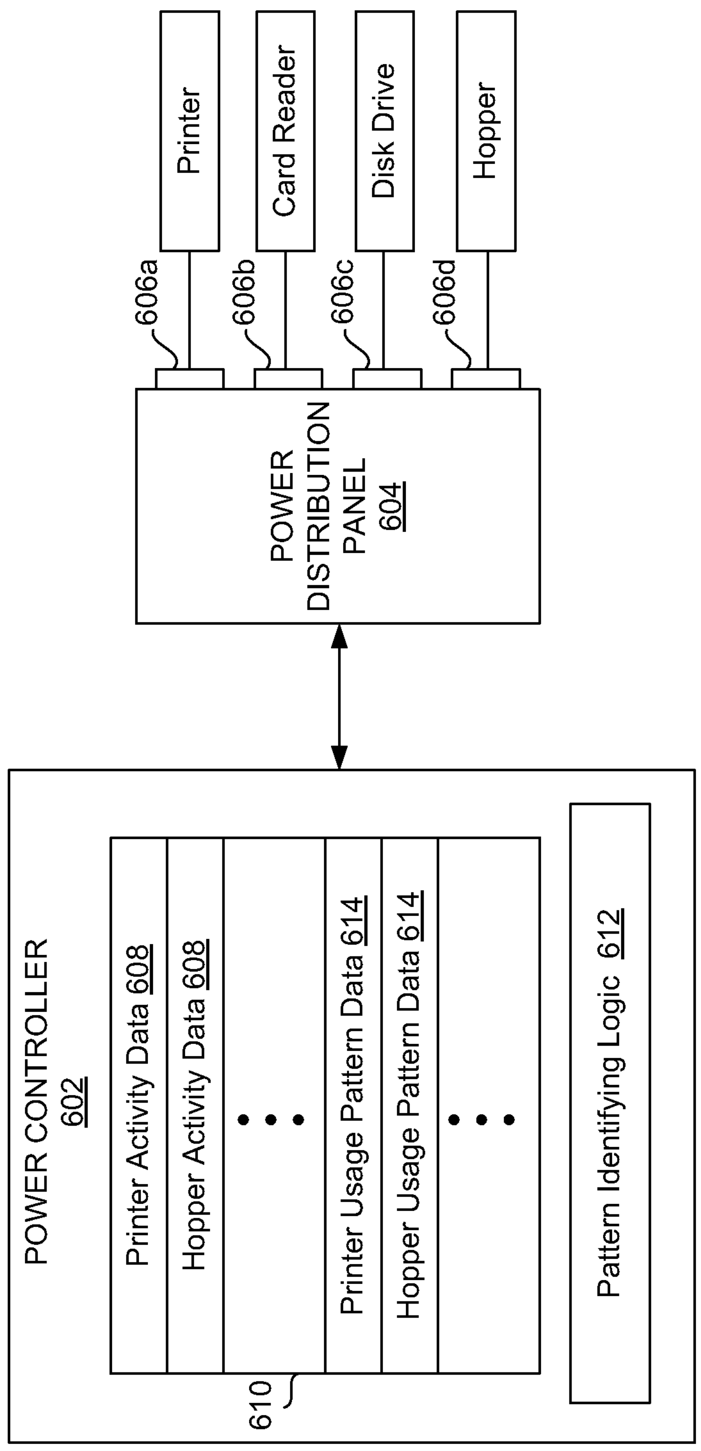
FIG. 6 is a block diagram showing a power controller and a power distribution panel for a CPU in accordance with one embodiment of the present invention.
Figure 11:
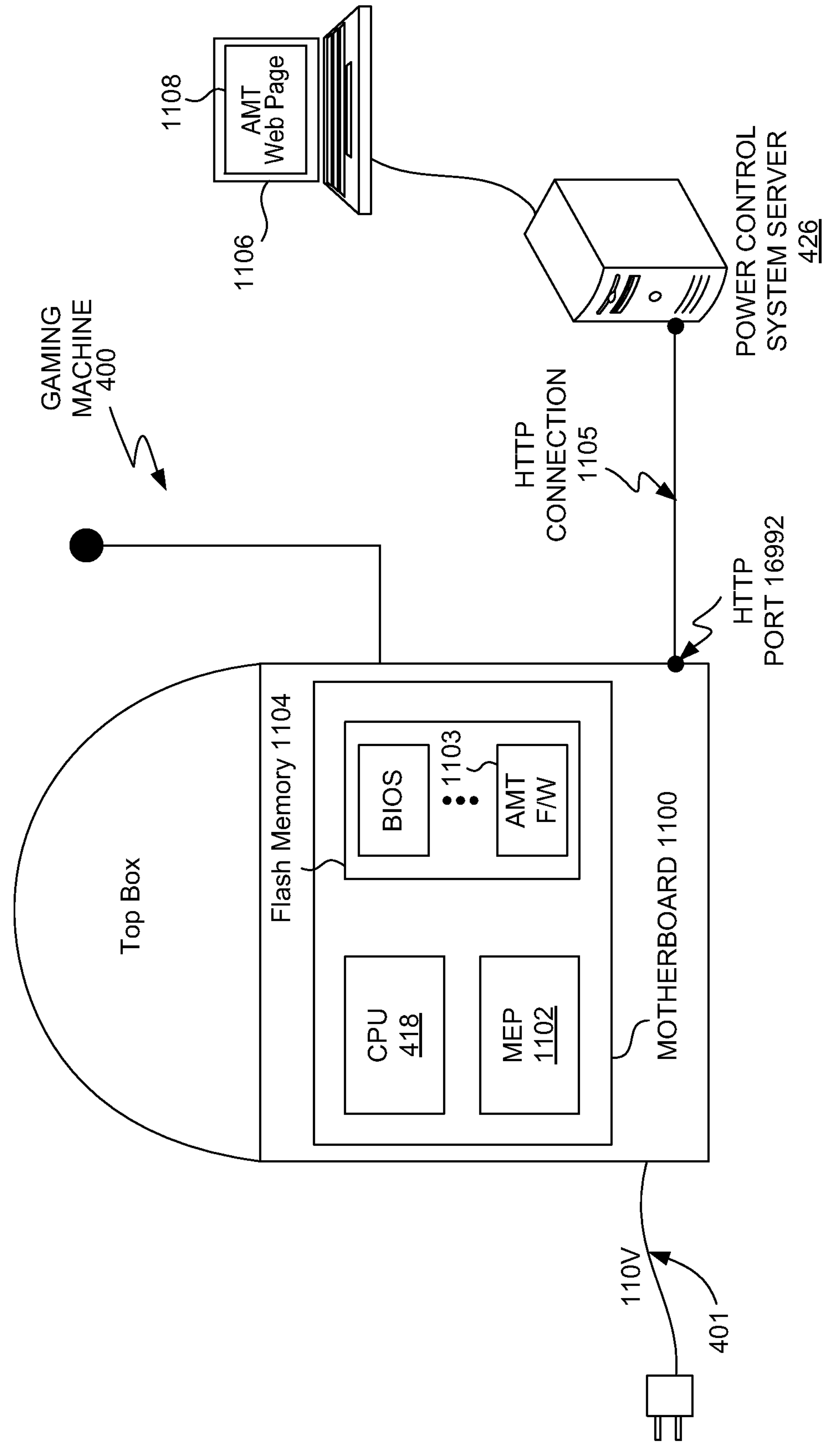
FIG. 11 is a block diagram of a gaming network showing a gaming machine and a power control system server in accordance with various embodiments.
Figure 12:
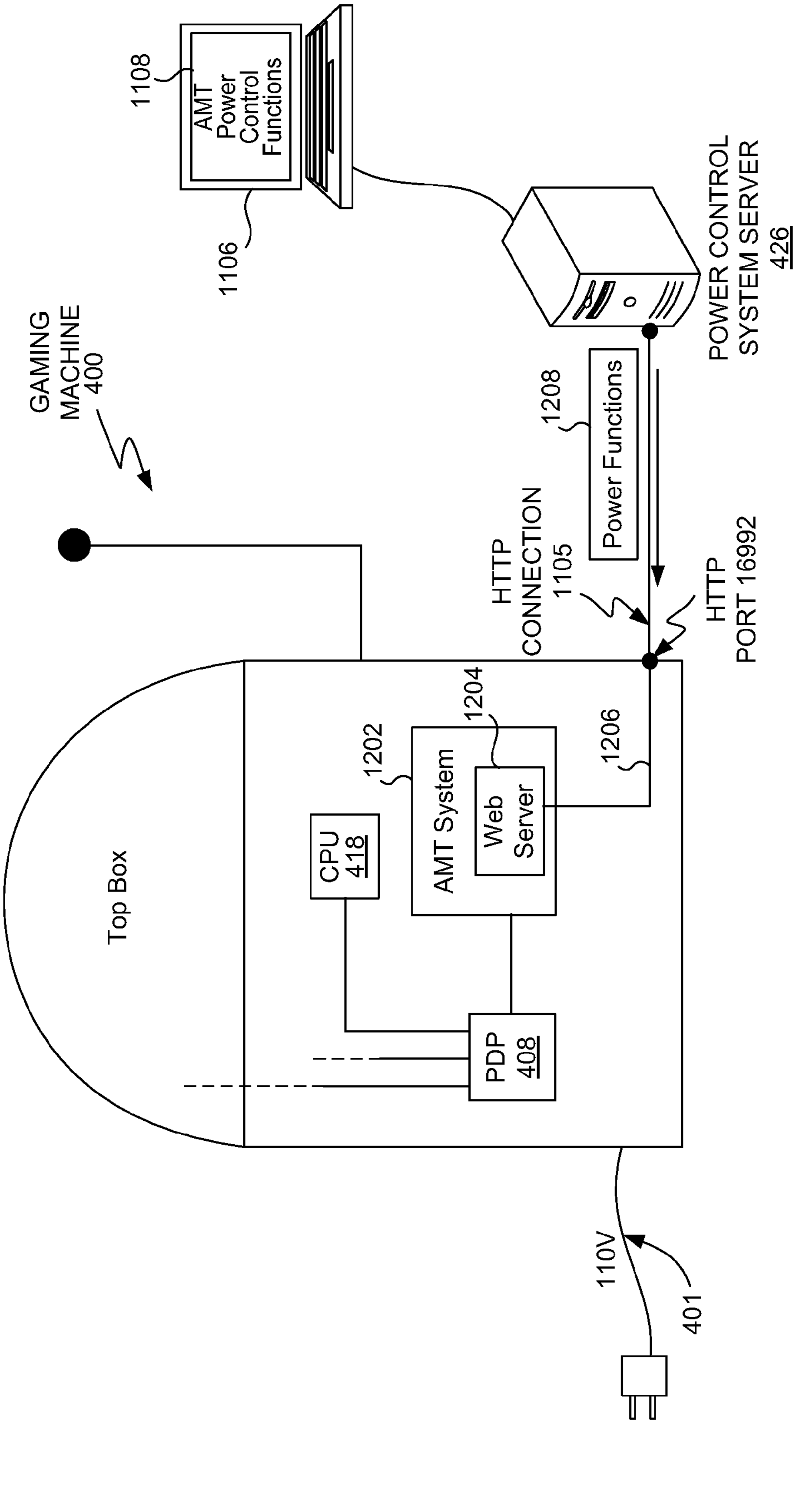
FIG. 12 is a block diagram of a gaming network showing further details of components on a gaming machine in communication with a power control system server in accordance with various embodiments.

FIG. 6 is a block diagram showing a power controller and a power distribution panel for a CPU, which further illustrates controllers 508, 510, and 512 of FIG. 5. A power controller 602 operates in conjunction with a power distribution panel 604 with ports 606*a*, 606*b* . . . to communicate with various gaming machine components. In a preferred embodiment, power controller 602 monitors and records the usage of components controlled by its associated one or more CPUs (not shown). For instance, power controller 508 for base CPU 418 monitors and stores the activity and usage of all or some of the components under control of base CPU 418. In one example, with respect to a printer, a power controller may record that the printer was activated and printed a ticket 10 times in a 24-hour period or printed a ticket seven times from 8 to 10 pm, and so on. It may also record the time the tickets were printed and other metrics. The frequency and granularity of the data being recording can be set by the gaming operator. In a preferred embodiment, monitoring of component usage is constant. Power controller 602 can also reside on a power control server or other network server and still perform monitoring and storage activities described via the gaming network as shown in FIGS. 11 and 12.

Raw usage data 608 are stored under control of power controller 602 in usage data storage area 610. Thus, in a preferred embodiment, a power controller monitors and stores raw usage data for all or some of the components controlled by the one or more associated CPUs. In this manner, in a preferred embodiment, power controllers 508, 510, and 512 create and store a body of raw data for each of the gaming machine components A, B, C . . . , X, Y, Z . . . , and so on.

In a preferred embodiment, power controller 602 examines the raw usage data 608 to identify usage patterns for a component. For example, power controller logic 612 or external software under its control examines raw data 608 for a statistically meaningful time period and stores usage pattern data 614 in storage area 610 or in a separate area accessible by power controller 602. In some embodiments, usage pattern data 614 are transmitted to power control system server 426 or both usage data 608 and usage pattern data 614 are transmitted to server 426. In other embodiments, these data or portions thereof may initially be stored and thus already reside on server 426 or other network server, such as an SBG server.

Logic 612 or other software tools necessary for analysis of raw data 608 to identify usage patterns can be developed by the gaming operator or can be a third-party software tool executed by the power controller's associated CPU. In a preferred embodiment usage pattern data 614 are transmitted to power control system server 426 where they are used as one factor in the power control system of the present invention. In another embodiment, raw usage data 608 are transmitted to server 426 and usage pattern analysis is performed on server 426 rather than on the gaming machine. In another embodiment, the analysis is distributed among gaming machine 400, server 426, and other gaming network servers.

Figure 7:
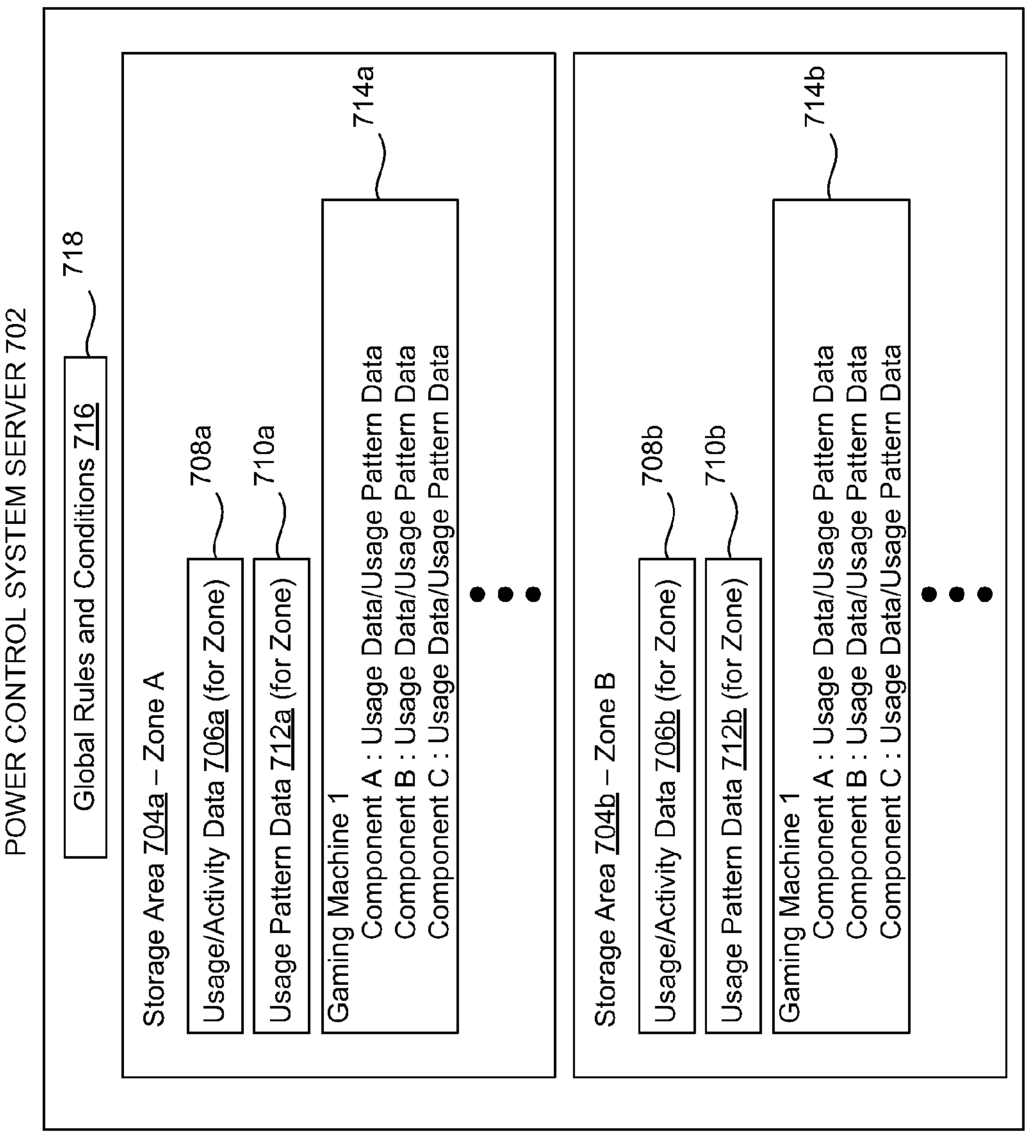
FIG. 7 is diagram showing data components and their organization on a power control server in accordance with one embodiment of the present invention.

As described above, gaming machines on a casino floor can be divided into zones wherein a zone is comprised of gaming machines having at least one common feature such as being in proximity to one another. In a preferred embodiment, power control system server, such as server 426, organizes its data based on gaming machine zones. FIG. 7 is diagram showing data components and their organization on a power control server in accordance with one embodiment of the present invention. At a high level, data on a server 702 are arranged based on zones. Storage area 704*a* stores data for one zone, such as zone A, storage area 704*b* stores data for zone B, and so on. The various zones do not have to be at the same gaming establishment. Server 702 can store and analyze data from zones at different physical gaming establishments are operated by one gaming operator or by different gaming operators where server 702 is under control of a third-party power control service provider. Thus, server 702 can be shared by more than one gaming operator where the gaming operators share the same goal of gaming machine power management. In another embodiment, all or some of the data components and software described can reside on another suitable network server.

In a preferred embodiment, storage areas 704*a*, 704*b*, etc. each store overall usage and activity data 706*a, b* . . . for the gaming machines in a zone in storage areas 708*a,b* . . . . As described above, these data can be derived from the gaming operator or from third-party software tools used to create "heat maps" of a casino floor. Storage areas 710*a,b* . . . each store usage pattern data 712*a, b* . . . for gaming machines in a zone. These data can be organized and stored in many different configurations and data schemas. Storage areas 714*a, b* . . . store usage data and pattern data for components for each gaming machine in a zone. In one configuration, usage pattern data for each component of a single gaming machine are stored together. In another configuration, usage pattern data for a single component, such as a printer, for all gaming machines in a zone are stored together. As is well known in the field of programming, the usage pattern data combined with the raw usage activity data can be stored as objects in an object oriented model or as a collection of relational database tables. Several other data storage and management implementations are possible. The data arrangement of FIG. 7 is only one high-level example. As described in greater detail below, storage area 718 of server 702 stores rules and conditions 716 that are examined to determine power supply to gaming machine in a zone.

Figure 8:
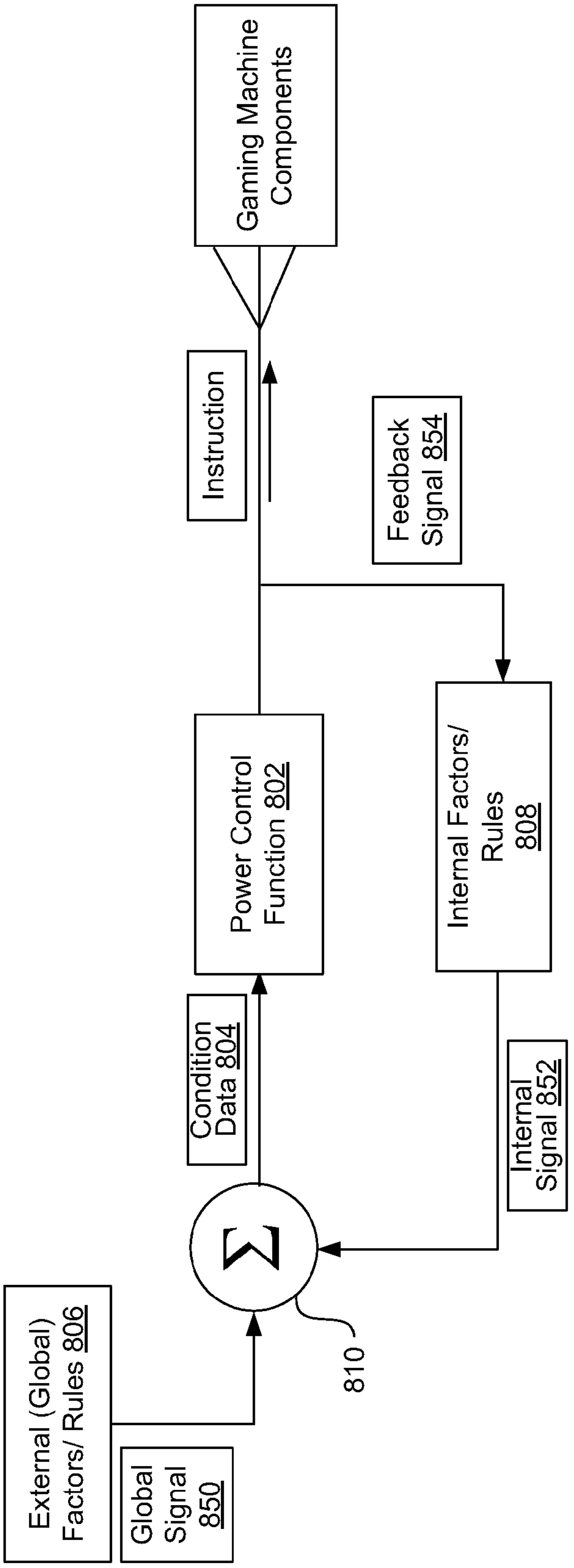
FIG. 8 is a diagram of a power control process for processing rules and conditions relating to power consumption by components of a gaming machine in accordance with one embodiment of the present invention.

FIG. 8 is a diagram of a power control process for processing rules and conditions relating to power consumption by components of a gaming machine in accordance with one embodiment of the present invention. In a preferred embodiment power control function 802 executes on a gaming machine (not shown). In a preferred embodiment, a power control function 802 accepts as input, condition data 804 that are a combination of data from an external source 806 and an internal source 808. In another embodiment, the power control process executed in a power controller resides on server 702, an SBG server or other suitable network server. An output from power control function 802 is one or more instructions to take action with respect to powering up or powering down gaming machine components.

In a preferred embodiment, external source 806 is power control system server 702. To describe the input from server 702, it is useful to start with the concept of gaming machine zones. As described earlier, usage patterns are derived for a gaming machine zone from unprocessed activity data from the gaming machines in that zone. Thus, certain high-level rules based on the usage patterns can be formulated for gaming machines in a particular zone. In a preferred embodiment, these rules can be categorized as temporal, spatial, event-based, or as combinations thereof. Based on the usage history of machines in a zone, a zone can be described as a "cold," "warm," or "hot" zone, depending on the day of the week (temporal), time of day (temporal), location (spatial), among other factors. In another embodiment, these characterizations and rules can be applied to an individual gaming machine rather than to a zone of machines. Moreover, there may be more or fewer than three activity levels. In some implementations there may be gradations within one or more of the cold, medium or hot levels. Such gradations may be based on one or more factors or factor types.

For example, in some implementations a gaming machine and/or a zone may be classified according to one of various default levels of "hotness" (e.g., from level A through level E) according to spatial factors, such as traffic patterns, historical gaming machine usage patterns, etc., in a gaming establishment. In one such example, a gaming machine may be assigned a spatial category of "A" because it is located in a high-traffic area. As described in more detail elsewhere herein, this level of hotness may correspond with a default level of readiness at which one or more components of a gaming machine may be maintained. However, the assigned level of hotness may depend on other factors, such as temporal factors. For example, a hotness level of 1 through 5 may be assigned to a gaming machine according to the time of day, the day of the week, etc. In some such implementations, the default hotness level can be a combination of more than one factor. Accordingly, the previously-referenced gaming machine may have a default hotness level ranging from A1 (here, the "hottest" level) to A5, depending on temporal factors. Other factors may be combined in a similar fashion. Some implementations allow a factor to be weighted or biased, such that its effect is greater than that of one or more other factors.

There are various examples that can be used to illustrate these rules, characterizations, and concepts. Many of them are likely to be based on temporal factors, such as: If the time is 3 am and the day is Tuesday, then send a global signal 850 to all machines in zone B to power down components A, B, and C. Alternatively, global signal 850 may indicate that one or more components should be kept in a lower state of readiness, such as a "sleep" mode or a "stand-by" mode. This rule may have been derived based on historical usage patterns, suggesting that machines in zone B are used infrequently at that time and day, and it is not energy efficient to keep components, such as ticket printers, lights, bill validators, and the like, at a constant state of readiness. In another temporal example, if the time is 9 pm and the day is Saturday, keep all components in all machines in all zones powered and at a constant state of readiness. A gaming operator can collect raw activity data at a granular level (e.g., every 15 minutes) or at a broader, coarser level to derive usage patterns.

In a spatial example, if a gaming machine is taken from a first location where there was little patron traffic to a second location where the traffic is high, thereby presumably changing the zone that the machine is in, the rules regarding that machine's state of readiness will be adjusted to reflect its new high-traffic location. Therefore, if the time is 6 pm and the day is Friday, at the first location, certain components are powered down because of only occasional traffic in the area (a "warm" zone). At the same time and day in the new location, only one component is powered down because of the higher traffic in its new "hot" zone. In a preferred embodiment, the global, external rules are zone based. Thus, in the preceding example, all other machines in the "hot" zone also have only one component powered down. As can be seen, there are numerous variations and possibilities of externally supplied, global rules and factors 806. Many, but not all, can be abstracted to a time/place conditional statement: If it is X time of day, on Y day, and machine is in Zone C, power down the following machine components. Or, machines in Zone B should never power down any components. In another example, a machine may be a stand-alone machine or placed at a location that is not part of a zone (e.g., for a special event), in which case the rules for the machine will take into account special circumstances such as times when the machine cannot be used (e.g., store hours or special event hours), and the like.

External, global input signal 850 described above is combined with an internal signal 852 from internal factors/rules module 808, where internal signal 852 originates from the gaming machine. Internal signal 852 represents an essentially unpredictable action that is taken on the gaming machine by a user or potential user. Signal 852 can also represent some effect on a gaming machine resulting from the machine's immediate environment or surroundings. In the embodiment where the power controller is on a server, the server receives internal signal 852 in close to real time so the power controller can act on the signal immediately thereby keeping any latency detectable by a user to a minimum. In a preferred embodiment, external, global signal 850 from server 702 is generally constant. There will likely always be some rule and resulting signal 850 for the time, day, and zone placement of a machine. Although it is possible that there is no global rule (perhaps because of insufficient historical data or usage pattern data) in which case, in a preferred embodiment, the machine will remain in a state of full readiness with all components powered on (i.e., the default power state).

Internal input signal 852 is created and transmitted when there is some action taken on or detected by the gaming machine. Some examples of actions taken on a machine include: a bill accepted by a bill validator, a card inserted into card reader, a person sitting on the machine seat, a person approaching the machine, a person pausing near the machine, a player tracking device being inserted, pressing any button on the machine, pulling the handle, inserting a coin, and so on. Some of these actions or events may require additional mechanisms for the machine, such as motion detectors and other sensors such as IR or optical detectors, ultrasonic detectors, or Webcams to detect when people pause in the area near a machine. The number of local factors is limited only by the capabilities of the gaming machine and the supplemental mechanisms and devices a gaming operator wants to have associated with the machine. In a preferred embodiment, a common characteristic of the local factors is that it is independent of other gaming machines or other components in a gaming network. Local factors enable a degree of independent control by a gaming machine over its own power consumption.

A summation or combination component 810 combines external, global signal 850 with internal, local signal 852. A combined signal 804 is input to power control function 802. An example of a combined signal may be (in narrative form): "Power down components 1-8 because it is 2 am and it is a Tuesday (global rule), and a $100 bill has been inserted into the bill validator (local factor)" or "Because it is 6 pm and it is a Sunday, power down components 3 and 4 (global), and the machine has detected motion nearby (local)." From a broader perspective, the global rules, derived primarily from zone-based historical usage patterns, provide a relatively coarse level of control of power consumption by gaming machines, which can be refined or adjusted by changing the frequency of data collection, the number of metrics, and so on. The local factors provide a comparatively fine level of control given that they derive from specific and generally unpredictable actions or events occurring on or near the machine and are independent of other components in a gaming network. In addition, in a preferred embodiment, data relating to these local actions or events, such as internal signal 852, do not need to be pushed or transmitted to power control system server or to any other gaming network component. In another embodiment, it may be desirable to have the local-factor, internal signal 852 processed by power control function 802 on a server.

Control function 802 processes the combined input signal by utilizing programmed intelligence to determine which of the machine's components should be powered on or off. In one scenario, a global rule which may instruct via signal 850 that six of the machines components be powered down may be overridden by a local factor, such as a card read or bill insert (embodied in signal 852). In another scenario, a motion detected in the vicinity of the machine may not be sufficient to override a "power down all components" global signal because it is 4 am and the passing by of one person is not sufficient to power up all the components, whereas an insert of a $100 bill would likely be sufficient. This intelligence can be programmed in the control function in the form of an algorithm, a series of conditional statements, an artificial intelligence ("AI") program, an object-oriented data model, or any other programming means as known to those skilled in the art. The degree of intelligence or level of sophistication of control function 802 is set by the gaming operator. Generally, response times to local factors need to be quick. That is, a few seconds after a user inserts a card, a bill or coin, a player tracking card, and so on, all the components of the machine should be powered up and ready to operate. There are known methods of distracting a user and "buying time" to allow the gaming machine to achieve a full state of readiness that can be used with the present invention, such as playing a short video clip or other type of animation immediately on powering up to lessen the player's perception of any latency.

In another embodiment, a local factor and internal signal 852 can be seen as a trigger that changes the state of readiness of a gaming machine as determined by a global factor or condition. In this embodiment, the global factor sets the "normal" power consumption of the gaming machine. A local factor can act as a triggering event that can change the normal state of readiness. In this case, the summation step may not be needed in that a local factor that is sufficiently significant to be a trigger will automatically alter the "normal" power consumption of the machine and need not be combined with global signal 850.

However, in a preferred embodiment, control function 802 processes the combined input signal and computes an instruction to immediately power up or power down components in the machine. In a preferred embodiment, control function 802 executes on a power controller in the gaming machine such as power controllers 508, 510, or 512. The instructions to power components in the gaming machine are transmitted to power distribution panels which in turn cut off or supply power to the components.

Control function 802 also generates a feedback signal 854 if it is detected that the gaming machine is still being used. Feedback signal 854 is transmitted to internal factors/rules module 808. The signal qualifies as an internal, local factor (i.e., that the machine is still in use or that at least one of the components is being used). Control function 802 sends a feedback signal 854 to module 808 which determines if the event or action is a local factor. If it is, an internal signal 852 is sent to summation component 810.

In another preferred embodiment of the power consumption control system of the present invention, a single power controller is utilized in a multi-station device, such as a gaming table or carousel with independent wagering stations. For example, a gaming table may have 5 to 10 wager gaming stations, each with its own set of components (often with fewer components than in a normal gaming machine).

Figure 9:
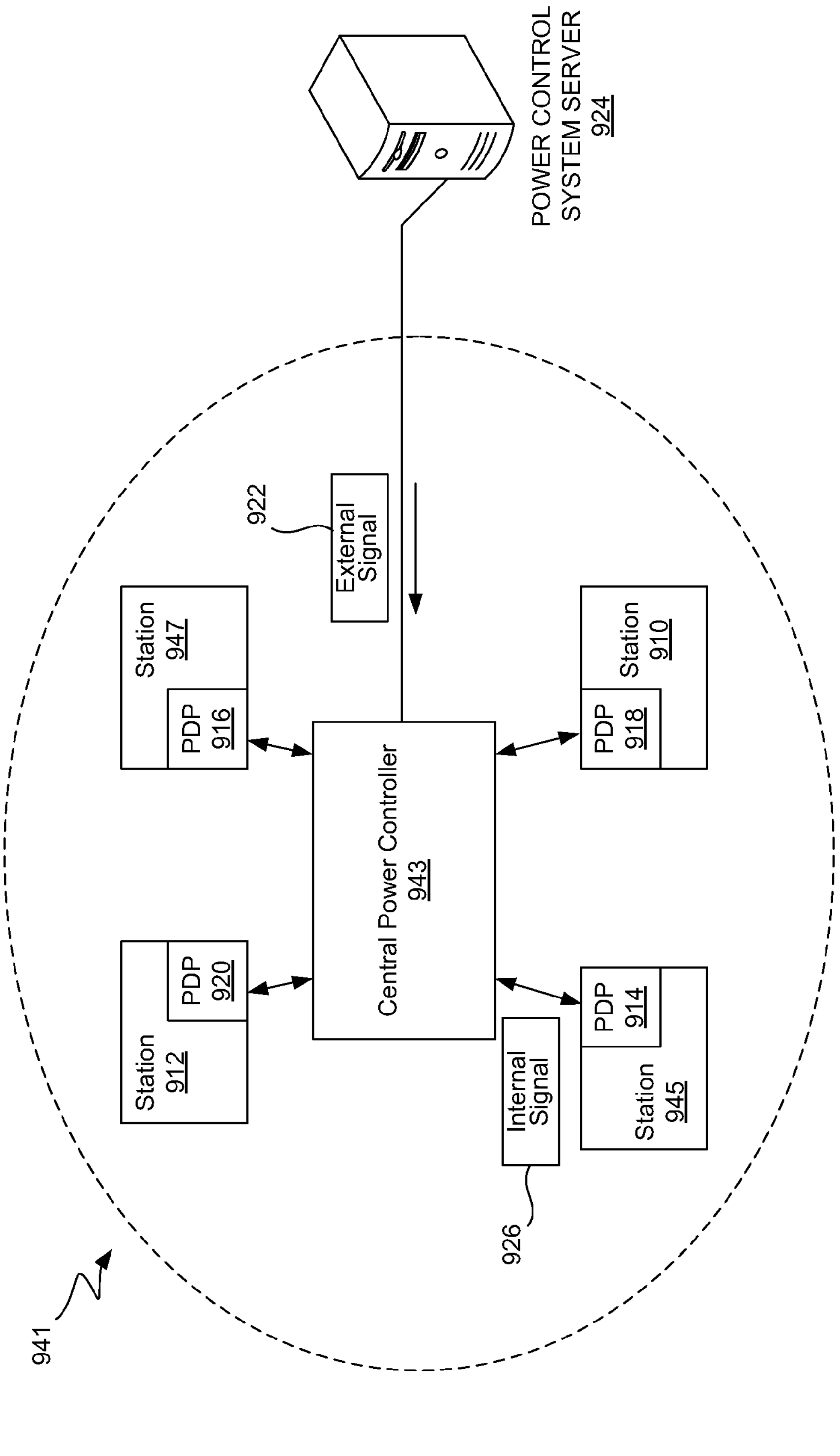
FIG. 9 is a diagram showing relevant power control components in a generic multi-station gaming apparatus connected to a power control system server in accordance with one embodiment of the present invention.

FIG. 9 is a diagram showing relevant power control components in a generic multi-station gaming apparatus connected to a power control system server in accordance with one embodiment of the present invention. A multi-station gaming apparatus 941, such as a gaming table or carousel, has a central power controller 943 connected to four gaming stations 945, 947, 910, and 912, which are independent wagering stations that operate under control of one gaming machine. Each gaming station 945-912 has its own set of components and peripherals (not shown), such as a ticket printer, card reader, bill acceptor, coin hopper, disk drives, and so on. In a preferred embodiment of the present invention, power consumed by each of the components of each gaming station 945 to 912 can be controlled using the methods and components described above, albeit in a different configuration. Each gaming station 945 to 912 has its own power distribution panel 914, 916, 918, and 920. Power controller 943 communicates with each power distribution panel in multi-station device 941 and transmits instructions to each distribution panel to power up or power down components connected to each gaming station 945-912. In a preferred embodiment, power control function 802, executing on power controller 943 processes external, global rules and conditions embodied in an external signal 922 from server 924. As in the preferred embodiment described above, power controller 943 stores raw usage data and usage pattern data for each gaming station 945 to 912. As described in FIG. 8, power control function 802 also receives local, internal signals, such as signal 926, from gaming stations 945 to 912.

Figure 10:
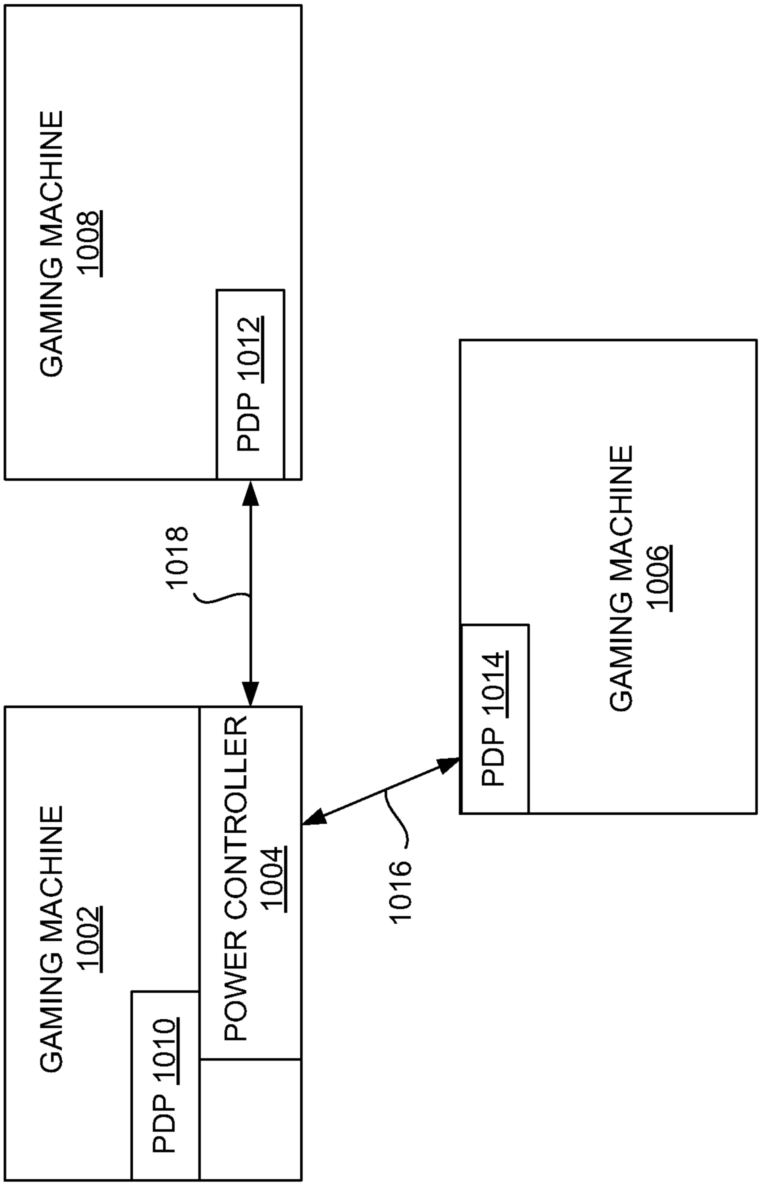
FIG. 10 is a diagram showing a peer-to-peer type configuration in which a power consumption control system is implemented among multiple gaming machines.

In another embodiment, a power controller operates in a gaming machine controlling the power distribution panel and power consumption of components in that gaming machine, as described in the figures above. The power controller, however, also controls power distribution panels in one or more other gaming machines. This peer-to-peer type configuration is shown in FIG. 10 in which a power consumption control system is implemented by having a gaming machine 1002 with a power controller 1004 in communication with other gaming machines 1006 and 1008 that do not have their own power controller. Each gaming machine has its own power distribution panels ("PDP") 1010, 1012, and 1014 that are in communication with power controller 1004 in gaming machine 1002, thereby forming a peer-to-peer implementation for controlling power consumption. In this embodiment, although there are fewer power controllers there is a greater need for communication among the gaming machines as shown by lines 1016 and 1018, thus increasing the number of cable connections, wiring, or wireless communication interfaces among gaming machines.

In another preferred embodiment, the power controller is embodied in a type of universal power card that can be inserted or retro-fitted into a gaming machine. A power controller card connects to or "taps" into the necessary communication lines, such as lines 410, 412, and 414 in FIG. 4, so the power controller can monitor activity usage and detect local events and actions. In another embodiment, it communicates directly with a gaming machine's CPUs. A power controller has its power distribution panel and relays so it can cut power to gaming machine components which connect or "plug into" the distribution panel.

In one embodiment of the present invention, power control system server 426 in FIG. 4 (or server 702 in FIG. 7) is able to power on or power off a gaming machine automatically and without human intervention. That is, a human being, such as a gaming technician or gaming operator, does not need to access the power control server in order to turn on or turn off the gaming machine. In another embodiment, another suitable server, such as a host server in a server-based gaming network may be used to implement the methods and systems described herein. For example, a host server in a server-based gaming network having responsibilities for casino floor management and configuration, including power management, may be used to implement the various embodiments described. In another embodiment, specific components of a gaming machine, instead of the entire machine, may be powered on or off using the methods and systems described. For example, only certain components or peripherals, such as lights, sounds (attract sequences to lure casino patrons), bill validators and card readers (to ensure that a machine ready to accept bills or player cards by a patron), or other components, may be powered on or off depending on various factors, including those described above with respect to average usage levels and usage patterns (see FIGS. 2 and 3) and activity within casino floor zones (see FIGS. 1A and 1B).

FIG. 11 is a logical block diagram showing relevant components of a gaming network in accordance with one embodiment. The network shown may be a server-based gaming network, but does not necessarily have to be. Details of a server-based gaming network are described in FIGS. 15 and 16. A gaming machine 400, as originally shown in FIG. 4, has a power cord 401 going to a power outlet (not shown) to receive electrical power (110 volts). The remote, automated powering (also referred to as "out-of-band" power management) techniques of the present invention, is applicable to gaming machines, as well as to other gaming apparatus. These apparatus include gaming tables or other multi-station gaming machines, where the entire table or apparatus may be powered on or off or only certain player stations within the apparatus/table may be controlled remotely. An example of a multi-station gaming apparatus is shown in FIG. 9.

Returning to FIG. 11, gaming machine 400 has a motherboard 1100 containing a chipset as found in gaming machines. Motherboard 1100 of the present invention contains CPU 418, as originally shown in FIG. 4. This is the CPU, also referred to as the master gaming controller (MGC), which is found in the base component of gaming machine 400. As opposed to other CPUs in other parts of the gaming machine (such as CPU 422 in player tracking unit 404 and CPU 424 in top box 406), CPU 418 controls game play logic, maintains the state of the gaming machine, and has other critical functions. For example, CPU 418 reads a flash memory 1104 in motherboard 1100 to access the gaming machine's BIOS (Basic Input/Output System). The ability to access BIOS is essential in powering up and powering down a gaming machine. In other embodiments, flash memory 1104 does not need to be on motherboard 1100.

Also shown in motherboard 1100 is a Manageability Engine processor (MEP) 1102 which is the hardware component of an Active Management Technology (AMT) system described herein. MEP 1102 is used to run AMT firmware 1103 stored in flash memory 1104. In a preferred embodiment, AMT firmware 1103 is stored in the same flash memory as the BIOS. Updates to AMT firmware 1103 are typically made at the same time updates are made to the BIOS. MEP 1102 and AMT firmware 1103 are available from Intel Corporation of Santa Clara, Calif. When the AMT system is invoked, as described below, AMT firmware 1103 executes on MEP 1103. Further details on AMT is available from Intel Corporation's Web site, information from which is incorporated herein in its entirety for all purposes. Generally, to install AMT, the gaming machine's BIOS settings are configured and the firmware and drivers must be installed.

Also shown as part of gaming machine 400 is an HTTP port 16992. In other embodiments, gaming machine 400 may have an HTTPS port 16993 if the HTTPS protocol is used. Many of the new gaming machines have an HTTP port 16992 that may be used for an HTTP connection, such as connection 1105, to a server. FIG. 11 shows a connection to power control system server 426. Other suitable host servers, such as in a server-based gaming network, may also be used, as described above. Generally, such a host server has casino floor power management and configuration responsibilities. A terminal 1106 is attached to power control system server 426. Terminal 1106 executes a Web browser 1108 that can display an AMT Web page.

Referring now to FIG. 12, also a logical block diagram showing a network similar to FIG. 11, other components and modules relevant to the present invention are shown in gaming machine 400. As originally shown in FIG. 11, machine 400 contains CPU 418 and power cord 401. Also shown is port 16992 and HTTP connection 1105 to server 426. Machine 400 contains an AMT system 1202. AMT system 1202 and CPU 418 are connected to power distribution panel (PDP) 408 which relays electrical power to the CPUs in gaming machine 400. PDP 408 is described in detail above. In other embodiments, there may not be PDP 408, but rather a conventional power management module responsible for power distribution in the gaming machine. In such an embodiment, AMT system 1202 may be connected directly to CPU 418.

AMT system 1202 includes a built-in Web server 1204. Web server 1204 is located on HTTP port 16992 as shown by connection 1206. Web server 1204 may be accessed via Web browser 1108 on terminal 1106 attached to server 426. Web browser 1108 displays AMT power control functions. These functions allow server 426 to control the power supplied to gaming machine 400. Through Web browser 1108, power functions 1208 may be transmitted over HTTP connection 1105 to gaming machine 400 which receives power functions/commands 1208 at port 16992 (or port 16993 if HTTPS). Gaming machine 400 has an IP address which server 426 may use to send functions/commands 1208 to machine 400. Thus, in the preferred embodiment, there is a TCP/IP connection between host server 426 and the gaming machines implementing AMT system 1202. AMT system 1202 enables gaming machine 400 to be turned on or off without human intervention. Such commands may be done automatically and remotely by server 426. The timing of power commands sent by server 426 to the gaming machines may be based on several factors described below, in addition to the average usage patterns and historical data described above. Thus, power consumption of gaming machines on a casino floor may be dynamically managed using various factors. Of course, AMT system 1202 also enables a human operator to enter power control functions using Web browser 1108. For example, a gaming operator may override certain scheduled power commands or modify triggering events which cause the transmission of power functions 1208. Web server 1204 on machine 400 may always be accessed via HTTP port 16992 regardless of whether gaming machine 400 is powered on or off.

Figure 13:
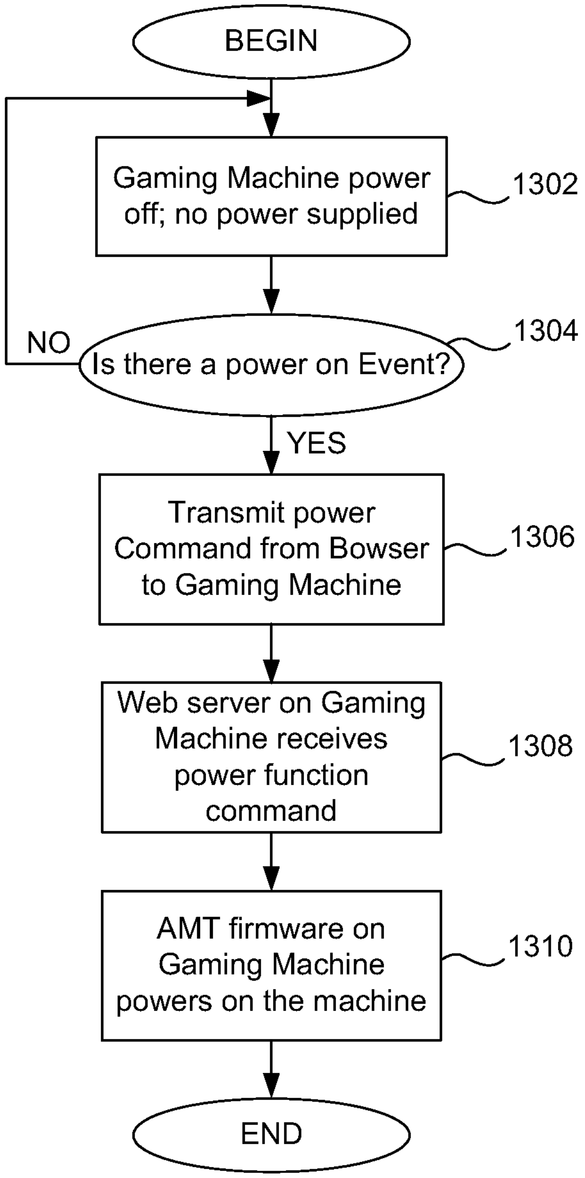
FIG. 13 is a flow diagram showing a process of powering on a gaming machine in accordance with various embodiments of the present invention.
Figure 14:
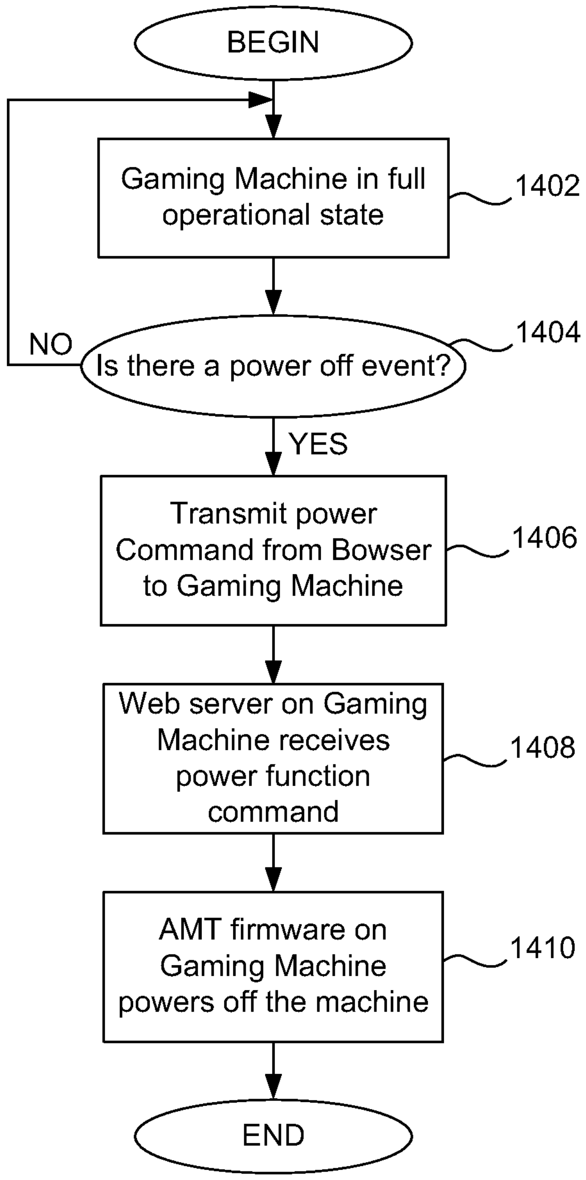
FIG. 14 is a flow diagram showing a process of powering off a gaming machine in accordance with various embodiments of the present invention.

FIGS. 13 and 14 are flow diagrams showing processes of powering on and powering off a gaming machine in accordance with various embodiments of the present invention. Although the two processes are similar, it is helpful to separate them to better describe the steps taken to power on and power off a machine using the AMT system. At step 1302 of FIG. 13, the gaming machine is powered off. For ease of illustration, it is assumed that all components and peripherals are powered off. Thus, at step 1302 the gaming machine does not draw any electrical power. At step 1304 server 426 determines whether there is an event has been triggered or whether a time/day is reached that would cause a "power on" command to be sent from Web browser 1108 via server 426 to gaming machine 400, specifically to Web server 1204.

As noted above, there are various events (including reaching a specific time and day) that may trigger a power command from server 426. One is based on casino floor activity. In this embodiment, the server may turn on a gaming machine based on the level of activity in the zone that includes the machine (a local bank of machines and numerous other criteria may be used to comprise a zone as described in FIGS. 1A and 1B). Using the average usage levels and usage patterns of machines in a zone, the server may send a power on command to the machine. Methods of triggering a gaming machine (or specific components/peripherals in the machine) to power on based on activity levels are described in detail above. The server can dynamically monitor usage of gaming machines in a zone and power a machine on or off based on machine usage dynamically instead of relying on historical usage patterns.

Another triggering event may stem from a fixed power on/off schedule for machines. As described above, certain machines may be powered off during slow hours (early am hours on weekdays, for example) and fully powered on during known high activity times, such as weekend nights. Such a schedule may be quite complex and be different for machines depending on which zone the machine is in, such as whether the machine is in a high traffic area, whether there are special events nearby that may lead to increased game play, and other factors. Server 426 may have an hourly, daily or weekly power on/off schedule for gaming machines.

Yet another event that may be used to power on a machine is through the use of motion detection technology. If the server detects that a patron is approaching or is walking by the machine through use of motion detectors attached to the machine, it may cause the machine to power on immediately to attract the patron. Conventional motion detection technology may be used and signals from the motion detectors may be sent to the server even if the gaming machine is not powered on (i.e., motion detection operation is not dependent on the gaming machine). This type of event is not predictable and thus the server may send a power control command to the machine at any time, assuming the machine is not already powered on. In other embodiments, a lack of motion detection in front of the machine may cause the server to power off the machine (this scenario is described in FIG. 14).

Another triggering event may be related to gaming regulations applicable in the gaming jurisdiction. A gaming regulation may require that a gaming machine not be powered on or operative for more than a certain amount of time during a specific time period. For example, a regulation may state that a gaming machine cannot be powered on or operative for more than 100 hours per week or 20 hours each day. This may not necessarily be a regulation from a gaming regulatory body, but may be a casino guideline. Or it may be dictated by power usage laws and regulations of the jurisdiction that the gaming machine operates in. Based on this regulation-related schedule, a triggering event may occur to power off a gaming machine.

Returning to step 1304, if there is an event, such as any of those described above, that indicates that the gaming machine should be powered on, command goes to step 1306 at which stage a power control command to power on the gaming machine is sent by the server via Web browser 1108 to the gaming machine. The HTTP message to power on the machine is received at port 16992 and at step 1308 Web server 1204 of AMT system 1202 receives the power function command. As noted above, Web server 1204 is able to receive this message even if the gaming machine is not powered. At step 1310 AMT firmware 1103 in flash memory executes on MEP 1102. This causes the CPU to execute the BIOS and the gaming machine begins the process of powering on. In other embodiments, specific components or peripherals within the machine may be supplied electrical current rather than powering on the entire machine. This may be implemented using power distribution panel (PDP) 408 and using the processes and systems described in FIGS. 1 to 10 above. At this stage the process of powering on the gaming machine is complete.

FIG. 14 is a flow diagram of a process of powering down a gaming machine using the AMT system in accordance with various embodiments. As noted, this flow diagram is similar to FIG. 13 except the gaming machine is powered off. At step 1402 the machine is in full operational state with all components and peripherals operating. In other embodiments, all peripherals need not be operating in order for the process described herein to be performed. At step 1404 the server detects whether there is a powering off event for the machine. As with step 1304 above, the host server is continually checking whether a triggering event has occurred, whether a certain time has passed, whether there is a manual override to a scheduled event, and so on. The powering off events may be the same as those described above. For example, the machine may be turned off at a scheduled time, such as 2 am on weekdays, if no one is playing on the machine. Or the machine may be turned off if the activity level on that machine is below a certain threshold for the machine's zone. Any powering off command would take effect only if the gaming machine is not being played. At step 1404, if there is no powering off event or trigger, control goes back to step 1402 and the server continues monitoring.

If there is a powering off event or trigger that occurs, the server will transmit a power off command from the browser via the server to the gaming machine, again at port 16992. Before sending such a command the server may check to ensure that the gaming machine is not being used by a patron. This may be a concern for scheduled events (e.g, turn machine off every weekday at 2 am). The method of sending a message to the gaming machine is the same as the one described at step 1306. A powering off event may occur if there is a tilt state on the machine or if the machine experiences any unusual or unauthorized activity. At step 1408 Web server 1204 receives the power off command. At step 1410 AMT firmware 1103 executing on MEP 1102 causes the gaming machine to power off by sending instructions to CPU 418 and/or to other power components, such as power distribution panel 408. The gaming machine proceeds to power down in a conventional manner. In one embodiment, the check to ensure that the machine is not being used by a player may be done by the machine itself rather than by the server. The machine may check its state to determine whether it is an appropriate time to power down. If it is not, it may wait for the state to change (e.g., for game play to stop and cash outs to complete) before it proceeds with powering down. In other embodiments, only certain components or peripherals of the machine may be powered down. This may be done using PDP 408 and other components and methods described above. This may be desirable if the gaming operator wants to keep certain components on, such as lights, sounds, bill acceptor, and others, to attract players to the machine. The gaming operator may not want the machine to appear to patrons who walk as being inoperable or unplugged. If a bill or card is inserted, the server may send a command to immediately power on all components of the machine (i.e., this would be a triggering event in step 1306 to power on the machine). At this stage the process is complete and the gaming machine is powered down. Of course, as described above, Web server 1204 within the machine's AMT system 1202 is still capable of receiving power function commands from the server.

In one embodiment, a power off command may be part of the external source signal 806 as described in FIG. 8. A power off command from the server may be one additional input or source for external signal 806 as used in the power control process for processing rules and conditions relating to power consumption by the gaming machine or by components within the machine. The spatial and temporal conditions described in FIG. 8 may also be used as factors in determining activity and usage levels of the gaming machines which, in turn, may be used by the server in its monitoring functions. It is also useful to note that the data and software on power control system server 726 as described in FIG. 7 (server 702) does not change with the AMT system. As described above, the server has a browser that is accessible via terminal 1106. The browser allows viewing of power control functions being sent to the gaming machines and the general state of the AMT system by the gaming operator. It may also be used to override scheduled events. The AMT system components reside on the gaming machines, namely MEP 1102, AMT firmware 1103, and Web server 1204. In other embodiments, there may be additional components or modules related to the implementation of the AMT system. More advanced versions of AMT may also require software or firmware on the server end.

Figure 15:
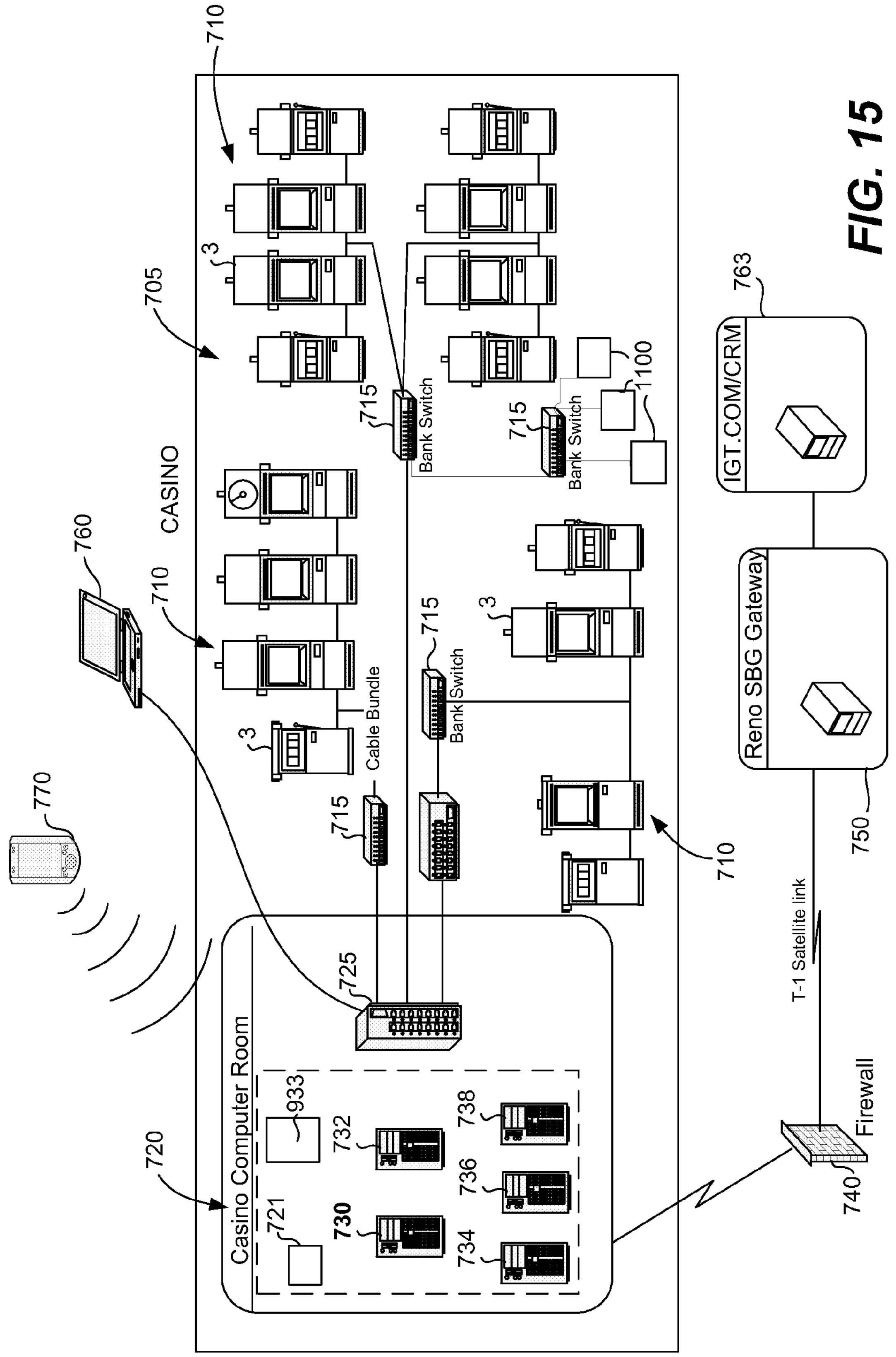
FIG. 15 illustrates one example of a gaming network topology for implementing certain aspects of the present invention.

One example of a network topology, which includes network connections between gaming machines in a zone and a power control system server or SBG server, for implementing some aspects of the present invention is shown in FIG. 15. Those of skill in the art will realize that this exemplary architecture and the related functionality are examples and that the present invention encompasses many other such embodiments and methods.

In FIG. 15, a single gaming establishment 705, in this case a casino, is illustrated. However, it should be understood that some implementations of the present invention involve multiple gaming establishments, each of which may have multiple gaming machine zones as described in FIGS. 1A and 1B above. Gaming establishment 705 includes 16 gaming machines 3, each of which is part of a bank 710 of gaming machines 3. In this example, gaming establishment 705 also includes a bank of networked gaming tables 1100, such as the multi-station gaming device described in FIG. 9. It will be appreciated that many gaming establishments include hundreds or even thousands of gaming machines 3 and/or gaming tables 1100, not all of which are included in a bank or gaming machine zone. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 3 may require multiple instances of some network devices (e.g., of main network device 725, which combines switching and routing functionality in this example) and/or the inclusion of other network devices not shown in FIG. 15. For example, some implementations of the invention may include one or more middleware servers, or the power control system server of the present invention, disposed between gaming machines 3 and server 730. Such middleware servers can provide various useful functions, including but not limited to the filtering and/or aggregation of data received from bank switches 710, from individual gaming machines and from other player terminals. Some implementations of the invention include load balancing methods and devices for managing network traffic.

Each bank 710 has a corresponding bank switch 715, which may be a conventional bank switch. Each bank switch is connected to SBG server 730 via main network device 725, which combines switching and routing functionality in this example. Although various floor communication protocols may be used, some preferred implementations use an open, Ethernet-based SuperSAS® protocol developed by IGT of Reno, Nev. and is available for downloading without charge. However, other protocols such as Best of Breed ("BOB") may be used to implement various aspects of SBG. IGT has also developed a gaming-industry-specific transport layer called CASH that executes on top of TCP/IP and offers additional functionality and security.

SBG server 730, License Manager 721, Arbiter 933, servers 732, 734, 736, and 738, and main network device 725 are disposed within computer room 720 of gaming establishment 705. Power control system server 702 described in FIG. 7 above may also be located within computer room 720. License Manager 721 may be implemented, at least in part, via a server or a similar device. Some exemplary operations of License Manager 721 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 730 can be configured to implement, at least in part, various aspects of the present invention. Some preferred embodiments of SBG server 730 and other servers shown in FIG. 15 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 721, servers 732, 734, 736, and 738, power control system server 702, and main network device 725) are mounted in a single rack with SBG server 730. Accordingly, many or all such devices are sometimes referenced in the aggregate as an "SBG server." However, in alternative implementations, one or more of these devices is in communication with SBG server 730 but located elsewhere. For example, some of the devices could be mounted in separate racks within computer room 720 or located elsewhere on the network. For example, it can be advantageous to store large volumes of data elsewhere via a storage area network ("SAN").

In some embodiments, these components of SBG server 730 preferably have an uninterruptible power supply ("UPS"). The UPS may be, for example, a rack-mounted UPS module.

Computer room 720 may include one or more operator consoles or other host devices that are configured for communication with SBG server 730 and with power control system server 702. Such host devices may be provided with software, hardware and/or firmware for implementing various aspects of the invention; many of these aspects involve controlling SBG server 730. However, such host devices need not be located within computer room 720. Wired host device 760 (which is a laptop computer in this example) and wireless host device 770 (which is a PDA in this example) may be located elsewhere in gaming establishment 705 or at a remote location. Such a wireless host device can also include gaming device 20.

Arbiter 933 may be implemented, for example, via software that is running on a server or another networked device. Arbiter 933 serves as an intermediary between different devices on the network. Some implementations of Arbiter 933 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 933 is a repository for the configuration information required for communication between devices on the gaming network (and, in some implementations, devices outside the gaming network). Although Arbiter 933 can be implemented in various ways, one exemplary implementation is discussed below.

Figure 16:
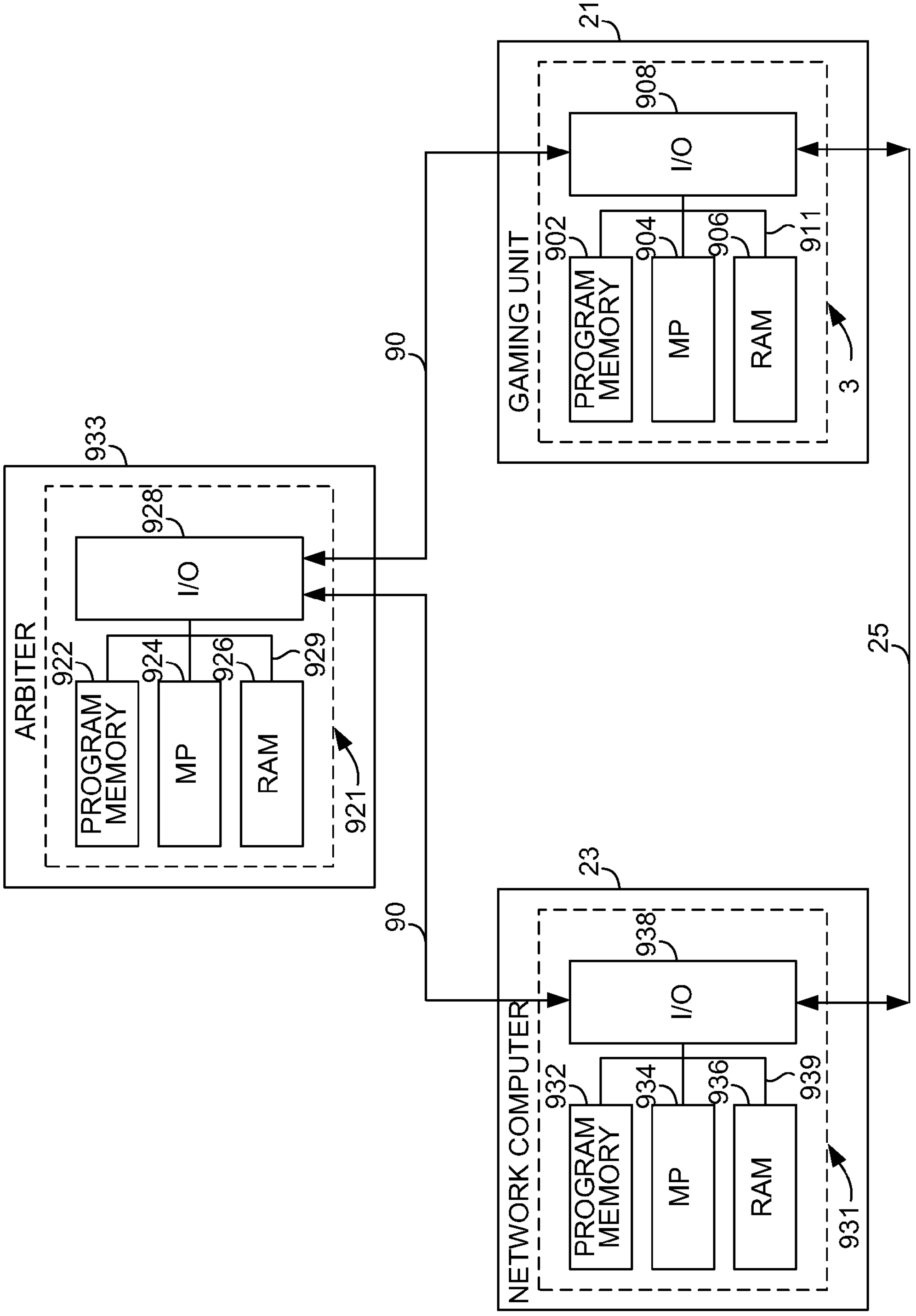
FIG. 16 is a block diagram illustrating a simplified gaming network topology for implementing an arbiter in a gaming network of the present invention.

FIG. 16 is a block diagram of a simplified communication topology between a gaming unit and machine 21, the network computer 23 and the Arbiter 933. Although only one gaming unit 21, one network computer 23 and one Arbiter 933 are shown in FIG. 16, it should be understood that the following examples may be applicable to different types of network gaming devices within the gaming network beyond the gaming unit 21 and the network computer 23, and may include different numbers of network computers, gaming security arbiters and gaming units. For example, a single Arbiter 933 may be used for secure communications among a plurality of network computers 23 and tens, hundreds or thousands of gaming units 21. Likewise, multiple gaming security arbiters 46 may be utilized for improved performance and other scalability factors.

Referring to FIG. 16, Arbiter 933 may include an arbiter controller 921 that may comprise a program memory 922, a microcontroller or microprocessor (MP) 924, a random-access memory (RAM) 926 and an input/output (I/O) circuit 928, all of which may be interconnected via an address/data bus 929. Network computer 23 may also include a controller 931 that may comprise a program memory 932, a microcontroller or microprocessor (MP) 934, a random-access memory (RAM) 936 and an input/output (I/O) circuit 938, all of which may be interconnected via an address/data bus 939. It should be appreciated that although the Arbiter 933 and the network computer 23 are each shown with only one microprocessor 924, 934, the controllers 921, 931 may each include multiple microprocessors 924, 934. Similarly, the memory of the controllers 921, 931 may include multiple RAMs 926, 936 and multiple program memories 922, 932. Although the I/O circuits 928 and 938 are each shown as a single block, it should be appreciated that the I/O circuits 928 and 938 may include a number of different types of I/O circuits. RAMs 924 and 934 and program memories 922 and 932 may be implemented as semiconductor memories, magnetically readable memories, and/or optically readable memories, for example.

Although the program memories 922, 932 are shown in FIG. 16 as read-only memories (ROM) 922, 932, the program memories of the controllers 921, 931 may be a read/write or alterable memory, such as a hard disk. In the event a hard disk is used as a program memory, the address/data buses 929, 939 shown schematically in FIG. 16 may each comprise multiple address/data buses, which may be of different types, and there may be an I/O circuit disposed between the address/data buses.

As shown in FIG. 16, the gaming unit 21, such as a reduced power-consumption wager gaming machine of the present invention, may be operatively coupled to the network computer 23 via the data link 25. The gaming unit 21 may also be operatively coupled to the Arbiter 933 via the data link 90, and the network computer 23 may likewise be operatively coupled to the Arbiter 933 via the data link 90. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, Arbiter 933 may verify the authenticity of each network gaming device. Arbiter 933 may receive a request for a communication session from a network device. For ease of explanation, the requesting network device may be referred to as the client, and the requested network device may be referred to as the host. The client may be any device on the network 705 and the request may be for a communication session with any other network device. The client may specify the host, or the gaming security arbiter may select the host based on the request and based on information about the client and potential hosts. Arbiter 933 may provide encryption keys (session keys) for the communication session to the client via the secure communication channel. Either the host and/or the session key may be provided in response to the request, or may have been previously provided. The client may contact the host to initiate the communication session. The host may then contact Arbiter 933 to determine the authenticity of the client. Arbiter 933 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, Arbiter 933 may contact the host regarding the request and provide corresponding session keys to both the client and the host. Arbiter 933 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs, tablet PCs, or even cellular telephones. Referring once again to FIG. 15, one or more network devices in gaming establishment 705 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 705 and the outside world should only be made with trusted devices via a secure link, e.g., via a virtual private network ("VPN") tunnel. For example, the connection between SBG 730, firewall 740, gateway 750 and central system 763 (here, IGT.com) that may be used for game downloads, etc., is advantageously made via a VPN tunnel.

An Internet-based VPN uses the open, distributed infrastructure of the Internet to transmit data between sites. A VPN may emulate a private TCP/IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 763 (in this example, IGT.com) to obtain the account information such as the customer's current and prior account status.

Moreover, such a secure connection may be used by the central system 763 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 763 may notify a local SBG server regarding new products and/or product updates. For example, central system 763 may notify a local SBG server regarding updates of new gaming software, gaming software updates, peripheral updates, the status of current gaming software licenses, etc. In some implementations of the invention, central system 763 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 763 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 763 and the gaming establishments.

Figure 17:
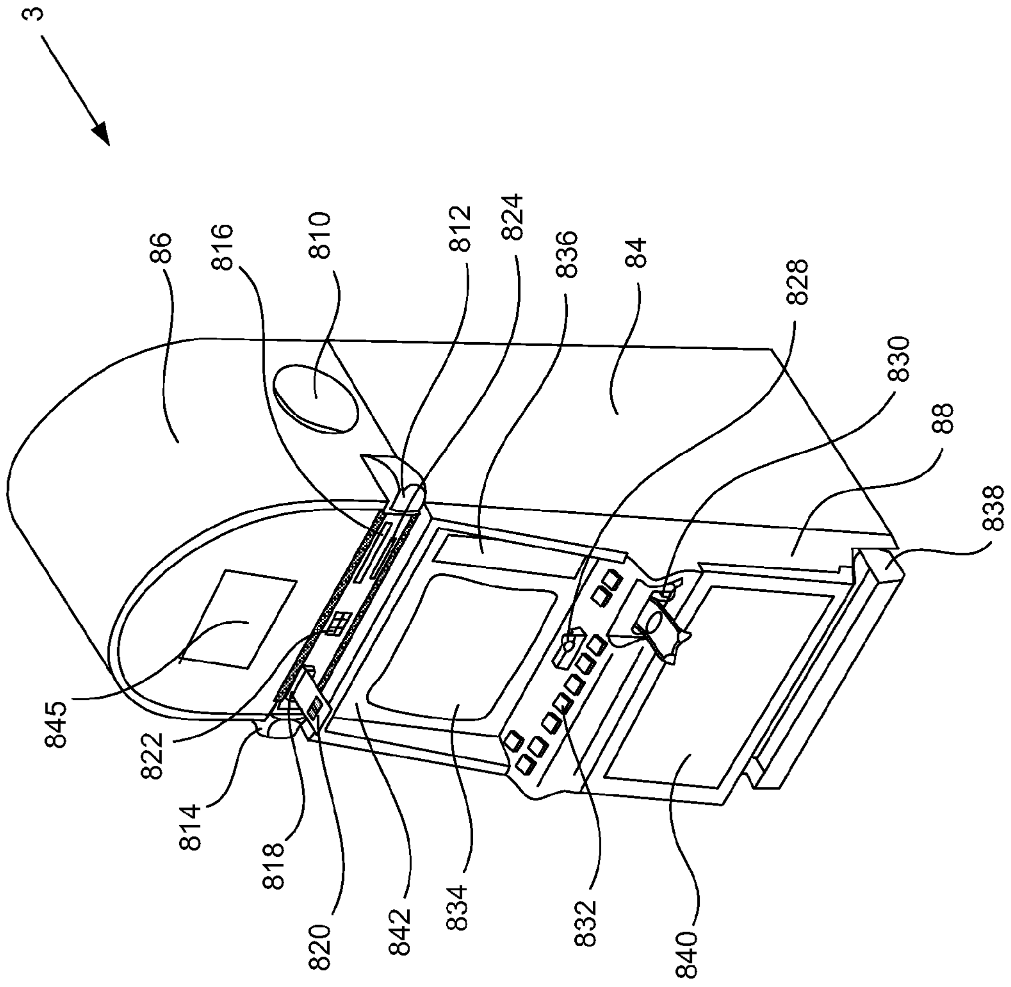
FIG. 17 is a perspective drawing of a free-standing gaming machine and its external components and features.

FIG. 17 is a perspective view of an electronic wager gaming machine, also described in FIG. 4 showing the various power-related devices, such a power controllers and power distribution panels. Components and modules of a gaming machine 3 may have equivalents in a mobile gaming device.

For example, a mobile gaming device may have a software-enabled module equivalent of a physical component in gaming machine 3. In some cases, components of machine 3 such as coin hoppers, coin tray, and bill validator, are not needed or not practicable to include with a mobile gaming device. Gaming machine 3 includes a main cabinet 84, which generally surrounds the machine interior (not shown) and is viewable by users. The main cabinet includes a main door 88 on the front of the machine, which opens to provide access to the interior of the machine. Attached to the main door are player-input switches or buttons 832, a coin acceptor 828, and a bill validator 830, a coin tray 838, and a belly glass 840. Viewable through the main door is a video display monitor 834 and an information panel 836. The display monitor 834 will typically be a cathode ray tube, high resolution flat-panel LCD, or other conventional electronically controlled video monitor. The information panel 836 may be a back-lit, silk screened glass panel with lettering to indicate general game information including, for example, a game denomination (e.g. $0.25 or $1). The bill validator 830, player-input switches 832, video display monitor 834, and information panel are devices used to play a game on the game machine 3. The devices are controlled by circuitry (e.g., the master gaming controller) housed inside the main cabinet 84 of the machine 3.

As described above, many different types of games, including mechanical slot games, video slot games, video poker, video black jack, video pachinko and lottery, may be provided with gaming machines of this invention. In particular, the gaming machine 3 may be operable to provide play of many different instances of wagering games of chance. The instances may be differentiated according to themes, sounds, graphics, type of game (e.g., slot game vs. card game), denomination, number of paylines, maximum jackpot, progressive or non-progressive, bonus games, etc. The gaming machine 3 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

As described in FIG. 4 above, wager gaming machine 3 includes a top box 86, which sits on top of the main cabinet 84. The top box 86 houses a number of devices, which may be used to add features to a game being played on the gaming machine 3, including speakers 810, 812, 814, a ticket printer 818 which prints bar-coded tickets 820, a key pad 822 for entering player tracking information, a florescent display 816 for displaying player tracking information, a card reader 824 for entering a magnetic striped card containing player tracking information, and a video display screen 845. The ticket printer 818 may be used to print tickets for a cashless ticketing system. Further, the top box 86 may house different or additional devices than shown in FIG. 17. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g., a master gaming controller) housed within the main cabinet 84 of the machine 3.

Gaming machine 3 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

It may appear that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As is well known in the field, PCs are generally not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware, software, and firmware components and architectures are utilized in gaming machines that are not typically found in general purpose computing devices, such as PCs. These components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normal gaming machine operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

In a preferred embodiment, gaming machines, or gaming platforms generally, are similar to computer platforms in that it is preferable that a gaming machine use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out-of-tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition is generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

A preferred method of operation for gaming machine game software of present invention is to use a state machine. Different functions of a game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, a gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery-backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the time just prior to the malfunction, including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

The gaming machines of the present invention may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine of the present invention by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in the gaming machine to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/1425,098, filed Aug. 8, 2001 and titled "PROCESS VERIFICATION," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming machines that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 17, when a user wishes to play gaming machine 3, he or she inserts cash through the coin acceptor 828 or bill validator 830. Additionally, the bill validator may accept a printed ticket voucher which may be accepted by the bill validator 830 as an indicia of credit when a cashless ticketing system is used. At the start of the game, the player may enter player tracking information using the card reader 824, the keypad 822, and the florescent display 816. Further, other game preferences of the player playing the game may be read from a card inserted into the card reader. During the game, the player views game information using the video display 834. Other game and prize information may also be displayed in the video display screen 845 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 832, the video display screen 834 or using some other device which enables a player to input information into the gaming machine. In some embodiments, the player may be able to access various game services such as concierge services and entertainment content services using the video display screen 834 and one more input devices.

During certain game events, the gaming machine 3 may display visual and auditory effects that can be perceived by the player. These effects add to the excitement of a game, which makes a player more likely to continue playing. Auditory effects include various sounds that are projected by the speakers 810, 812, 814. Visual effects include flashing lights, strobing lights or other patterns displayed from lights on the gaming machine 3 or from lights behind the belly glass 840. After the player has completed a game, the player may receive game tokens from the coin tray 838 or the ticket 820 from the printer 818, which may be used for further games or to redeem a prize. Further, the player may receive a ticket 820 for food, merchandise, or games from the printer 818.

Figure 18:
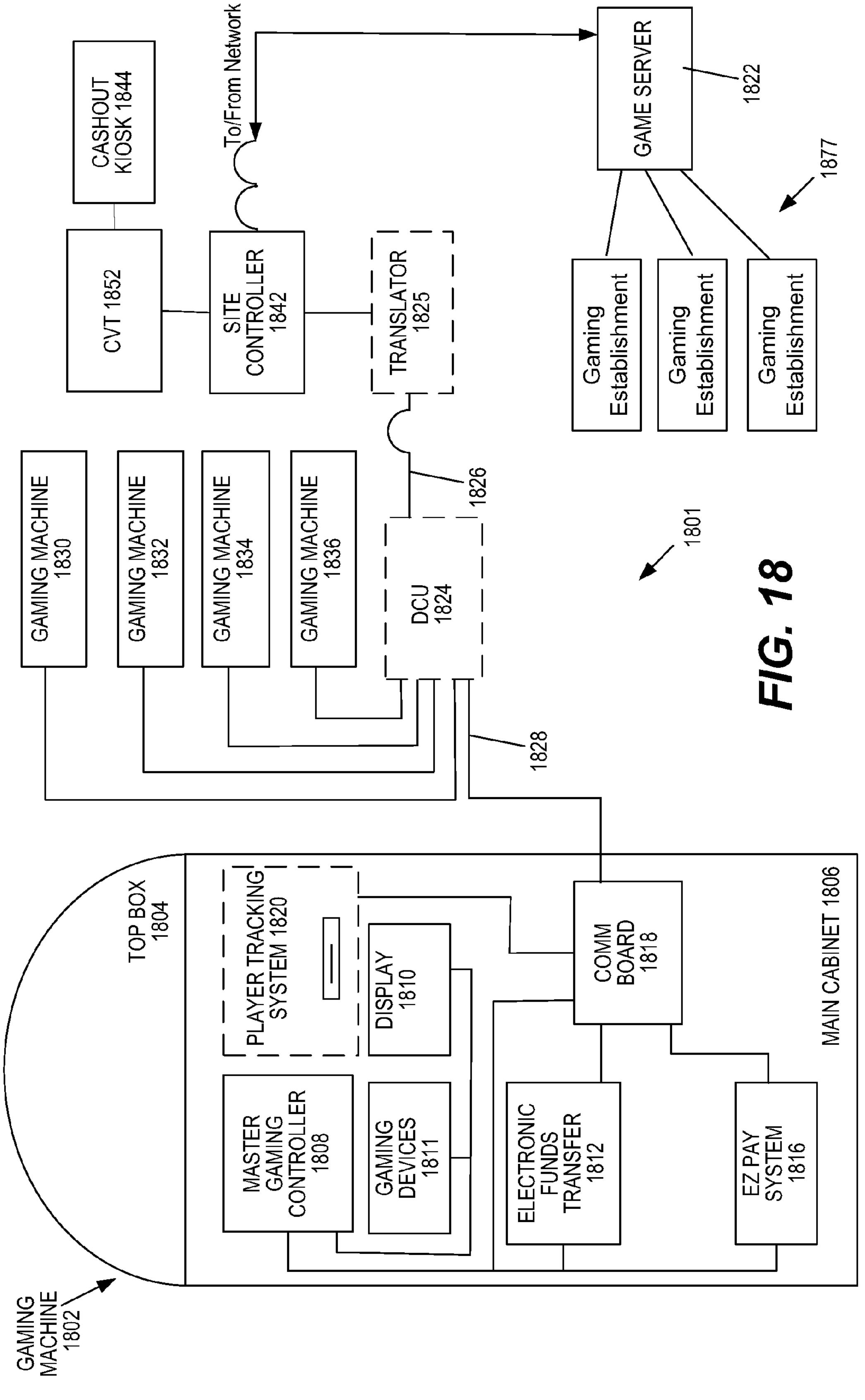
FIG. 18 is an illustration of a free-standing gaming machine and a gaming network.

An alternative gaming network that may be used to implement additional methods in accordance with other embodiments of the present invention is depicted in FIG. 18. Gaming establishment 1801 could be any sort of gaming establishment, such as a casino, a card room, an airport, a store, etc. In this example, gaming network 1877 includes more than one gaming establishment, all of which are networked to game server 1822.

Here, gaming machine 1802, and the other gaming machines 1830, 1832, 1834, and 1836, include a main cabinet 1806 and a top box 1804. The main cabinet 1806 houses the main gaming elements and can also house peripheral systems, such as those that utilize dedicated gaming networks. The top box 1804 may also be used to house these peripheral systems.

The master gaming controller 1808 controls the game play on the gaming machine 1802 according to instructions and/or game data from game server 1822 or stored within gaming machine 1802 and receives or sends data to various input/output devices 1811 on the gaming machine 1802. In one embodiment, master gaming controller 1808 includes processor(s) and other apparatus of the gaming machine systems. The master gaming controller 1808 may also communicate with a display 1810.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1808 may also communicate with EFT system 1812, EZPay™ system 1816 (a proprietary cashless ticketing system of the present assignee), and player tracking system 1820. The systems of the gaming machine 1802 communicate the data onto the network 1828 via a communication board 1818.

In another embodiment, mobile gaming devices are in communication with one another or with gaming machines in a peer-to-peer configuration over a suitable data network. Communications links can be established as shown between one mobile gaming device and another. One or more of the mobile gaming devices are configured to operate the same as game server, rather than coupling a separate mobile gaming server to the network. Those skilled in the art will appreciate that the software, hardware or combination thereof within one or more of the mobile gaming devices, described in greater detail below.

Gaming server or servers of the present invention can be effectively removed from the system while maintaining the same functionality. In one example, a plurality of gaming modules are distributed among the various mobile gaming devices and gaming machines. If possible, certain modules are installed on the particular mobile gaming devices where users will likely request those games. When a user requests a particular game on a given device, and that game is not already stored in memory on or accessible by the gaming device it sends a request message to other devices in the network.

It will be appreciated by those of skill in the art that embodiments of the present invention could be implemented on a network with more or fewer elements than are depicted in FIG. 18. For example, player tracking system 1820 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1824 and translator 1825 are not required for all gaming establishments 1801. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1842 provides this function for gaming establishment 1801. Site controller 1842 is connected to a central system and/or other gaming establishments via one or more networks, which may be public or private networks. Among other things, site controller 1842 communicates with game server 1822 to obtain game data, such as ball drop data, bingo card data, etc.

In the present illustration, gaming machines 1802, 1830, 1832, 1834 and 1836 are connected to a dedicated gaming network 1828. In general, the DCU 1824 functions as an intermediary between the different gaming machines on the network 1828 and the site controller 1842. In general, the DCU 1824 receives data transmitted from the gaming machines and sends the data to the site controller 1842 over a transmission path 1826. In some instances, when the hardware interface used by the gaming machine is not compatible with site controller 1842, a translator 1825 may be used to convert serial data from the DCU 1824 to a format accepted by site controller 1842. The translator may provide this conversion service to a plurality of DCUs.

Further, in some dedicated gaming networks, the DCU 1824 can receive data transmitted from site controller 1842 for communication to the gaming machines on the gaming network. The received data may be, for example, communicated synchronously to the gaming machines on the gaming network.

Here, CVT 1852 provides cashless and cashout gaming services to the gaming machines in gaming establishment 1801. Broadly speaking, CVT 1852 authorizes and validates cashless gaming machine instruments (also referred to herein as "tickets" or "vouchers"), including but not limited to tickets for causing a gaming machine to display a game result and cash-out tickets. Moreover, CVT 1852 authorizes the exchange of a cashout ticket for cash. These processes will be described in detail below. In one example, when a player attempts to redeem a cash-out ticket for cash at cashout kiosk 1844, cash out kiosk 1844 reads validation data from the cashout ticket and transmits the validation data to CVT 1852 for validation. The tickets may be printed by gaming machines, by cashout kiosk 1844, by a stand-alone printer, by CVT 1852, etc. Some gaming establishments will not have a cashout kiosk 1844. Instead, a cashout ticket could be redeemed for cash by a cashier (e.g. of a convenience store), by a gaming machine or by a specially configured CVT.

Figure 19:
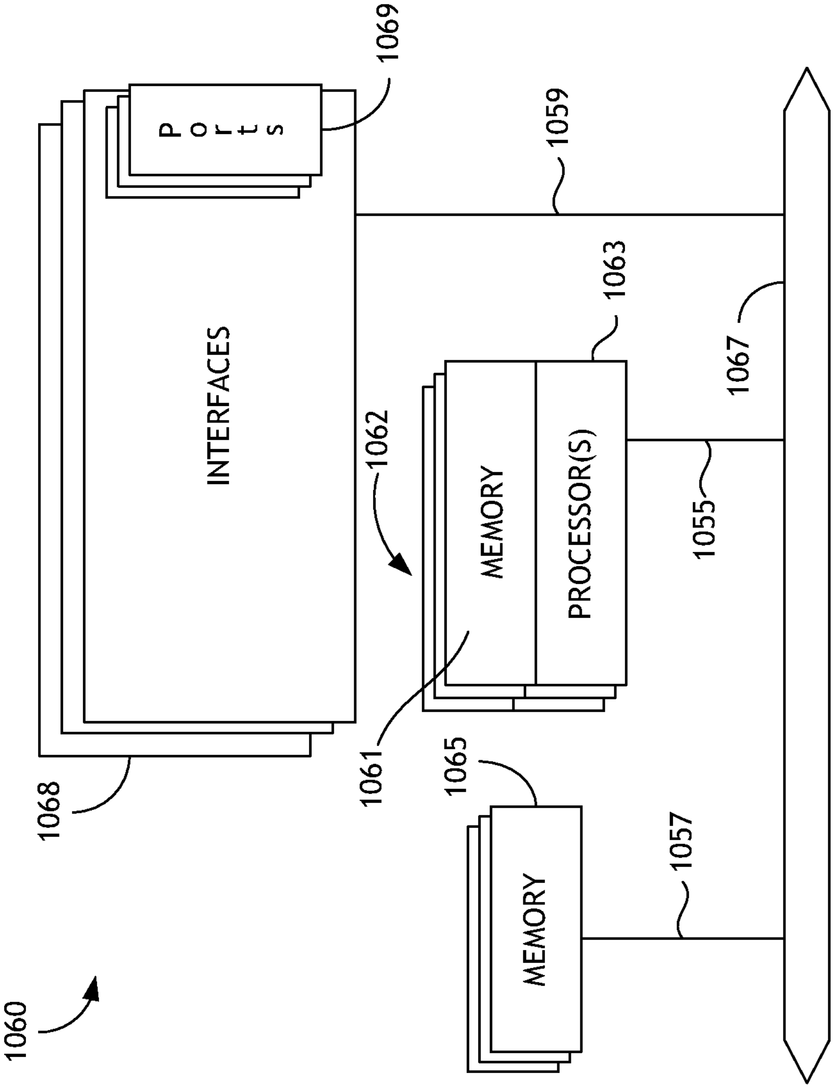
FIG. 19 is an illustration of a network device that may be configured for implementing some methods of the present invention.

FIG. 19 illustrates an example of a network device that may be configured for implementing some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. Accordingly, these independent processors perform at least some of the functions of the logic described herein. In other embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of the network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 19 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 19) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A wager gaming machine comprising:

a master gaming controller;

a network interface having an input port supporting a TCP/IP connection using a gaming machine IP address;

a Web server operating on the input port wherein the Web server receives an HTTP message when the wager gaming machine is powered off or when it is powered on, the HTTP message based on a triggering event;

wherein, the triggering event is one or more of:

an occurrence of a specific time and a specific day;

casino floor activity or wager gaming machine zone activity;

a gaming regulation relating to an amount of time the wager gaming machine must be in the power off state during a time range; and a motion detection signal from the wager gaming machine while the wager gaming machine is in a power-off state; and upon receiving the HTTP message, a BIOS system within the wager gaming machine is activated and enables the machine to go from a power off state to the power on state without human intervention.

2. The wager gaming machine of claim 1 wherein the HTTP message is received from a server, the server configured to monitor usage of gaming machines in a zone and to dynamically power the gaming machine on or off based on machine usage.

3. The wager gaming machine of claim 2, wherein the server is configured to dynamically power the gaming machine on or off without relying on historical usage patterns.

4. The wager gaming machine of claim 1 wherein the HTTP message is received from a server, the server configured to power the gaming machine on or off based on schedule determining the occurrence of the specific time and the specific day.

5. A method comprising:

receiving a command to power on a wager gaming machine based on a triggering event, the wager gaming machine being in a power off state;

creating an HTTP power-on message for powering on the wager gaming machine, wherein the HTTP power-on message is created in a Web browser; and transmitting the HTTP power-on message, from a server, to the wager gaming machine over a TCP/IP connection, wherein the wager gaming machine receives the message via an HTTP-specific port, wherein upon receiving the message a BIOS system within the wager gaming machine is activated and enables the machine to go from a power off state to the power on state without human intervention; wherein the triggering event is one or more of:

an occurrence of a specific time and a specific day;

casino floor activity or wager gaming machine zone activity;

a gaming regulation relating to an amount of time the wager gaming machine must be in the power off state during a time range; and a motion detection signal from the wager gaming machine while the wager gaming machine is in a power-off state.

6. A method as recited in claim 5 wherein the wager gaming machine is able to receive the HTTP power on message while the wager gaming machine is in the power off state.

7. A method as recited in claim 5 wherein the TCP/IP connection is part of a server-based gaming network.

8. A method as recited in claim 5 wherein the wager gaming machine is a multi-station gaming machine.

9. A method of powering off a wager gaming machine, the method comprising:

receiving a command to power off a wager gaming machine based on a triggering event;

creating an HTTP power-off message for the wager gaming machine; and transmitting the HTTP power-off message, from a server, to the wager gaming machine over a TCP/IP connection, wherein the wager gaming machine receives the message at an HTTP-specific port, thereby causing a powering off of the gaming machine using normal shutdown procedures without human intervention; wherein the triggering event is one or more of:

an occurrence of a specific time and a specific day;

casino floor activity or wager gaming machine zone activity;

a gaming regulation relating to an amount of time the wager gaming machine must be in the power off state during a time range; and a motion detection signal from the wager gaming machine while the wager gaming machine is in a power-off state.

10. A method as recited in claim 9 wherein the TCP/IP connection is part of a server-based gaming network.

11. A method as recited in claim 9 wherein the wager gaming machine is a multi-station gaming machine.

12. A gaming network comprising:

a host server having a Web browser for displaying an active management Web page;

an IP-addressable wager gaming machine having an input port supporting a Web server; and a TCP/IP connection between the host server and the wager gaming machine, wherein, upon receiving the HTTP message, a BIOS system within the wager gaming machine is activated and enables the machine to go from a power off state to the power on state without human intervention, the HTTP message based on a triggering event;

wherein, the triggering event is one or more of:

an occurrence of a specific time and a specific day;

casino floor activity or wager gaming machine zone activity;

a gaming regulation relating to an amount of time the wager gaming machine must be in the power off state during a time range; and a motion detection signal from the wager gaming machine while the wager gaming machine is in a power-off state.

13. A gaming network as recited in claim 12 wherein the host server is a power control server in a server-based gaming network.

14. A gaming network as recited in claim 12 wherein the IP-addressable wager gaming machine further includes a flash memory storing the BIOS.

15. A gaming network as recited in claim 12 wherein the input port in the IP-addressable wager gaming machine is an HTTP port.

16. A gaming network as recited in claim 12 wherein the wager gaming machine is accessible via the TCP/IP connection when the wager gaming machine is in a power off state.

* * * * *